US00RE40385E

(19) United States
(12) Reissued Patent
Bang et al.

(10) Patent Number: US RE40,385 E
(45) Date of Reissued Patent: Jun. 17, 2008

(54) ORTHOGONAL COMPLEX SPREADING METHOD FOR MULTICHANNEL AND APPARATUS THEREOF

(75) Inventors: Seung-Chan Bang, Daejeon (KR); Jae-Ryong Shim, Daejeon (KR); Ki-Chul Han, Daejeon (KR); Jung-im Kim, Daejeon (KR); Tae-Joong Kim, Daejeon (KR)

(73) Assignee: Electronics and Telecom Research Institute, Daejeon (KR)

(21) Appl. No.: 10/932,227

(22) Filed: Sep. 2, 2004

Related U.S. Patent Documents

Reissue of:
(64) Patent No.: 6,449,306
Issued: Sep. 10, 2002
Appl. No.: 09/767,953
Filed: Mar. 27, 2001

U.S. Applications:
(63) Continuation of application No. 09/162,764, filed on Sep. 30, 1998, now Pat. No. 6,222,873.

(30) Foreign Application Priority Data

Dec. 2, 1997 (KR) ..... 97-65375
Apr. 4, 1998 (KR) ..... 98-11923

(51) Int. Cl.
*H04B 1/707* (2006.01)

(52) U.S. Cl. ..... 375/141; 375/146; 375/298
(58) Field of Classification Search ..... 375/130, 375/140, 141, 146, 259, 261, 295, 298
See application file for complete search history.

(56) References Cited

U.S. PATENT DOCUMENTS 5,309,474 A 5/1994 Gilhousen et al.
5,337,338 A 8/1994 Sutton
5,416,797 A 5/1995 Gilhousen et al.

(Continued)

FOREIGN PATENT DOCUMENTS

EP 0 783 210 7/1997
EP 0814581 A2 12/1997
JP 07038962 2/1995

(Continued)

OTHER PUBLICATIONS

CSEM/Pro Telecom, et al., "FMA–FRAMES Multiple Access A Harmonized Concept for UMTS/IMT–2000; FMA2–Wideband CDMA", Homepage: http://www.de.infowin.org/ACTS/RUS/PROJECTS/FRAMES, pp. 1–14.
Birgenheier, Raymond A.; "Overview of Code–Domain Power, Timing, and Phase Measurements"; *Hewlett–Packard Journal*; vol. 47, No. 1, pp. 73–93; (Feb. 1996).

(Continued)

*Primary Examiner*—Kevin Burd
(74) *Attorney, Agent, or Firm*—Hunton & Williams LLP

(57) ABSTRACT

An orthogonal complex spreading method for a multichannel and an apparatus thereof are disclosed. The method includes the steps of complex-summing $\alpha_{n1}W_{M,n1}X_{n1}$ which is obtained by multiplying an orthogonal Hadamard sequence $W_{M,n1}$ by a first data $X_{n1}$ of a n-th block and $\alpha_{n2}W_{M,n2}X_{n2}$ which is obtained by multiplying an orthogonal Hadamard sequence $W_{1,n2}$ by a second data $X_{n2}$ of a n-th block; complex-multiplying $\alpha_{n1}W_{M,n1}X_{n1}+j\alpha_{n2}W_{M,n2}X_{n2}$ which is summed in the complex type and $W_{M,n3}+jPW_{M,n4}$ of the complex type using a complex multiplier and outputting as an in-phase information and quadrature phase information; and summing only in-phase information outputted from a plurality of blocks and only quadrature phase information outputted therefrom and spreading the same using a spreading code.

287 Claims, 21 Drawing Sheets

U.S. PATENT DOCUMENTS

| | | | | | |
|---|---|---|---|---|---|
| 5,511,073 | A | | 4/1996 | Padovani et al. | |
| 5,566,164 | A | | 10/1996 | Ohlson | |
| 5,602,833 | A | | 2/1997 | Zehavi | |
| 5,619,526 | A | * | 4/1997 | Kim et al. | 370/335 |
| 5,712,869 | A | | 1/1998 | Lee et al. | |
| 5,818,867 | A | | 10/1998 | Rasmussen et al. | |
| 5,870,378 | A | | 2/1999 | Huang et al. | |
| 5,903,761 | A | * | 5/1999 | Tyma | 717/148 |
| 5,920,551 | A | | 7/1999 | Na et al. | |
| 5,930,230 | A | * | 7/1999 | Odenwalder et al. | 370/208 |
| 5,940,434 | A | | 8/1999 | Lee | |
| 5,960,029 | A | | 9/1999 | Kim et al. | |
| 5,991,284 | A | | 11/1999 | Willenegger et al. | |
| 6,028,888 | A | | 2/2000 | Roux | |
| 6,052,404 | A | | 4/2000 | Tiepermann | |
| 6,097,712 | A | * | 8/2000 | Secord et al. | 370/335 |
| 6,108,369 | A | * | 8/2000 | Ovesjo et al. | 375/146 |
| 6,144,691 | A | * | 11/2000 | Kenney | 375/130 |
| 6,222,873 | B1 | * | 4/2001 | Bang et al. | 375/146 |
| 6,246,697 | B1 | | 6/2001 | Whinnett et al. | |
| 6,246,976 | B1 | | 6/2001 | Mukaigawa et al. | |
| 6,269,088 | B1 | * | 7/2001 | Masui et al. | 370/335 |
| 6,381,229 | B1 | | 4/2002 | Narvinger et al. | |
| 6,519,278 | B1 | | 2/2003 | Hiramatsu | |
| 6,560,194 | B1 | | 5/2003 | Gourgue et al. | |
| 2003/0147655 | A1 | | 8/2003 | Shattil | |

FOREIGN PATENT DOCUMENTS

| | | |
|---|---|---|
| KR | 1997-0031399 | 6/1997 |
| KR | 0155510 | 7/1998 |
| KR | 10-0298340 | 5/2001 |
| WO | WO 92/17011 | 10/1992 |
| WO | WO 95/03652 | 2/1995 |
| WO | WO 95/12937 | 5/1995 |
| WO | WO-97/33400 | 9/1997 |
| WO | WO-97/45970 | 12/1997 |
| WO | WO 97/47098 | 12/1997 |

OTHER PUBLICATIONS

Jae Ryong Shim and Seung Chan Bang; Spectrally efficient modulation and spreading scheme for CDMA systems; Electronics Letters; Nov. 12, 1998, vol. 34, No. 23; pp. 2210–2211.

Edited by Matsushita: UTRA Physical Layer Description, TDD parts for public operation; Layer 1 Expert Group meeting, Bocholt May 18–20; Nov. 13, 1998; pp. 1–27.

Yang, G., Vos, G., Cho, H., I/Q Modulator Image Rejection Through Modulation Pre–distortion, IEEE, May 1996, 1317–1320.

Dekorsky, Armin and Kammeyer, Karl–Dirk, M–ary Orthogonal Modulation For MC–CDMA Systems in Indoor Wireless Radio Networks, Multi–Carrier Spread–Spectrum 69–76, 1997 (Kluwer Academic Publishers, Netherlands).

Barbarossa, S. and Scaglione, A., Polynomial Minimum Shift Keying Modulation: Simplified Decoding of CPM Signals, 1997 IEEE, 145–148.

* cited by examiner

FIG. 8

8x8 HADAMADA MATRIX

| | | | | | | | | |
|---|---|---|---|---|---|---|---|---|
| 1 | 1 | 1 | 1 | 1 | 1 | 1 | 1 | $W_0$ |
| 1 | −1 | 1 | −1 | 1 | −1 | 1 | −1 | |
| 1 | 1 | −1 | −1 | 1 | 1 | −1 | −1 | |
| 1 | −1 | −1 | 1 | 1 | −1 | −1 | 1 | |
| 1 | 1 | 1 | 1 | −1 | −1 | −1 | −1 | $W_4$ |
| 1 | −1 | 1 | −1 | −1 | 1 | −1 | 1 | |
| 1 | 1 | −1 | −1 | −1 | −1 | 1 | 1 | |
| 1 | −1 | −1 | 1 | −1 | 1 | 1 | −1 | |
| $W_0$ | | | | $W_4$ | | | | |

ORTHOGONAL COMPLEX SPREADING METHOD FOR MULTICHANNEL AND APPARATUS THEREOF

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,449,306. The reissue applications are application Ser. Nos. 10/932,227 (this application), which was filed on Sep. 2, 2004 and 11/648,915, a continuation reissue application of 10/932,227, which was filed on Jan. 3, 2007 and is still pending.*

This application is a continuation of application Ser. No. 09/162,764, now U.S. Pat. No. 6,222,873.

BACKGROUND OF THE INVENTION

1. Field of the Invention

The present invention relates to an orthogonal complex spreading method for a multichannel and an apparatus thereof, and in particular, to an improved orthogonal complex spreading method for a multichannel and an apparatus thereof which are capable of decreasing a peak power-to-average power ratio by introducing an orthogonal complex spreading structure and spreading the same using a spreading code, implementing a structure capable of spreading complex output signals using a spreading code by adapting a permutated orthogonal complex spreading structure for a complex-type multichannel input signal with respect to the summed values, and decreasing a phase dependency of an interference based on a multipath component (when there is one chip difference) of a self signal, which is a problem that is not overcome by a permutated complex spreading modulation method, by a combination of an orthogonal Hadamard sequence.

2. Description of the Conventional Art

Generally, in the mobile communication system, it is known that a linear distortion and non-linear distortion affect power amplifier. The statistical characteristic of a peak power-to-average power ratio has a predetermined interrelationship for a non-linear distortion.

The third non-linear distortion which is one of the factors affecting the power amplifier causes an inter-modulation product problem in an adjacent frequency channel. The above-described inter-modulation product problem is generated due to a high peak amplitude for thereby increasing an adjacent channel power (ACP), so that there is a predetermined limit for selecting an amplifier. In particular, the CDMA (Code Division Multiple Access) system requires a very strict condition with respect to a linearity of a power amplifier. Therefore, the above-described condition is a very important factor.

In accordance with IS-97 and IS-98, the FCC stipulates a condition on the adjacent channel power (ACP). In order to satisfy the above-described condition, a bias of a RF power amplifier should be limited.

According to the current IMT-2000 system standard recommendation, a plurality of CDMA channels are recommended. In the case that a plurality of channels are provided, the peak power-to-average power ratio is considered as an important factor for thereby increasing efficiency of the modulation method.

The IMT-2000 which is known as the third generation mobile communication system has a great attention from people as the next generation communication system following the digital cellular system, personal communication system, etc. The IMT-2000 will be commercially available as one of the next generation wireless communication system which has a high capacity and better performance for thereby introducing various services and international loaming services, etc.

Many countries propose various IMT-2000 systems which IC require high data transmission rates adapted for an internet service or an electronic commercial activity. This is directly related to the power efficiency of a RF amplifier.

The CDMA based IMT-2000 system modulation method introduced by many countries is classified into a pilot channel method and a pilot symbol method. Of which, the former is directed to the ETRI 1.0 version introduced in Korea and is directed to CDMA ONE introduced in North America, and the latter is directed to the NTT-DOCOMO and ARIB introduced in Japan and is directed to the FMA2 proposal in a reverse direction introduced in Europe.

Since the pilot symbol method has a single channel effect based on the power efficiency, it is superior compared to the pilot channel method which is a multichannel method. However since the accuracy of the channel estimation is determined by the power control, the above description does not have its logical ground.

FIG. 1 illustrates a conventional complex spreading method based on a CDMA ONE method. As shown therein, the signals from a fundamental channel, a supplemental channel, and a control channel are multiplied by a Walsh code by each multiplier of a multiplication unit 20 through a signal mapping unit 10. The signals which are multiplied by a pilot signal and the Walsh signal and then spread are multiplied by channel gains A0, A1, A2 and A3 by a channel gain multiplication unit 30.

In a summing unit 40, the pilot signal multiplied by the channel gain A0 and the fundamental channel signal multiplied by the channel gain A1 are summed by a first adder for thereby obtaining an identical phase information, and the supplemental channel signal multiplied by the channel gain A2 and the control channel signal multiplied by the channel gain A3 are summed by a second adder for thereby obtaining an orthogonal phase information.

The thusly obtained in-phase information and quadrature-phase information are multiplied by a PN1 code and PN2 code by a spreading unit 50, and the identical phase information multiplied by the PN2 code is subtracted from the identical phase information multiplied by the PN1 code and is outputted as an I channel signal, and the quadrature-phase information multiplied by the PN1 code and the in-phase information multiplied by the PN2 code are summed and are outputted through a delay unit as a Q channel signal.

The CDMA ONE is implemented using a complex spreading method. The pilot channel and the fundamental channel spread to a Walsh code 1 are summed for thereby forming an in-phase information, and the supplemental channel spread to the Walsh code 2 and the control channel spread to a Walsh code 3 are summed for thereby forming an quadrature-phase information. In addition, the in-phase information and quadrature-phase information are complex-spread by PN codes.

FIG. 2A is a view illustrating a conventional CDMA ONE method, and FIG. 2B is a view illustrating a maximum eye-opening point after the actual shaping filter of FIG. 2A.

As shown therein, in the CDMA ONE, the left and right information, namely, the in-phase information (I channel) and the upper and lower information, namely, the quadrature-phase information (Q channel) pass through the actual phase shaping filter for thereby causing a peak power, and in the ETRI version 1.0 shown in FIGS. 3A and 3B, a peak power may occur in the transverse direction for thereby causing deterioration.

In view of the crest factor and the statistical distribution of the power amplitude, in the CDMA ONE, the peak power is generated in vertical direction, so that the irregularity problem of the spreading code and an inter-interference problem occur.

SUMMARY OF THE INVENTION

Accordingly, it is an object of the present invention to provide an orthogonal complex spreading method for a multichannel and an apparatus thereof overcome the aforementioned problems encountered in the conventional art.

The CDMA system requires a strict condition for a linearity of a power amplifier, so that the peak power-to-average power ratio is important. In particular, the characteristic of the IMT-2000 system is determined based on the efficiency of the modulation method since multiple channels are provided, and the peak power-to-average power ratio is adapted as an important factor.

It is another object of the present invention to provide an orthogonal complex spreading method for a multichannel and an apparatus thereof which have an excellent power efficiency compared to the CDMA-ONE introduced in U.S.A. and the W-CDMA introduced in Japan and Europe and is capable of resolving a power unbalance problem of an in-phase channel and a quadrature-phase channel as well as the complex spreading method.

It is still another object of the present invention to provide an orthogonal complex spreading method for a multichannel and an apparatus thereof which is capable of stably maintaining a low peak power-to-average power ratio.

It is still another object of the present invention to provide an orthogonal complex spreading method for a multichannel and an apparatus thereof in which a spreading operation is implemented by multiplying a predetermined channel data among data of a multichannel by an orthogonal Hadamard sequence and a gain and, multiplying a data of another channel by an orthogonal Hadamard sequence and a gain, summing the information of two channels in complex type, multiplying the summed information of the complex type by the orthogonal Hadamard sequence of the orthogonal type, obtaining a complex type, summing a plurality of channel information of the complex type in the above-described manner and multiplying the information of the complex type of the multichannel by a spreading code sequence.

It is still another object of the present invention to provide an orthogonal complex spreading method for a multichannel and an apparatus thereof which is capable of decreasing the probability that the power becomes a zero state by preventing the FIR filter input state from exceeding ±90° in an earlier sample state, increasing the power efficiency, decreasing the consumption of a bias power of a back-off of the power amplifier and saving the power of a battery.

It is still another object of the present invention to provide an orthogonal complex spreading method for a multichannel and an apparatus thereof which is capable of implementing a POCQPSK (Permutated Orthogonal Complex QPSK) which is another modulation method and has a power efficiency similar with the OCQPSK (Orthogonal Complex QPSK).

In order to achieve the above objects, there is provided an orthogonal complex spreading method for a multichannel which includes the steps of complex-summing $\alpha_{n1}W_{M,n1}X_{n1}$ which is obtained by multiplying an orthogonal Hadamard sequence $W_{M,n1}$ by a first data $X_{n1}$ of a n-th block and $\alpha_{n2}W_{M,n2}X_{n2}$ which is obtained by multiplying an orthogonal Hadamard sequence $W_{M,n2}$ by a second data $X_{n2}$ of a n-th block; complex-multiplying $\alpha_{n1}W_{M,n1}X_{n1}+j\alpha_{n2}W_{M,n2}X_{n2}$ which is summed in the complex type and $W_{M,n3}+jW_{M,n4}$ of the complex type using a complex multiplier and outputting as an in-phase information and quadrature-phase information; and summing only in-phase information outputted from a plurality of blocks and only quadrature-phase information outputted therefrom and spreading the same using a spreading code.

In order to achieve the above objects, there is provided an orthogonal complex spreading apparatus according to a first embodiment of the present invention which includes a plurality of complex multiplication blocks for distributing the data of the multichannel and complex-multiplying $\alpha_{n1}W_{M,n1}X_{n1}+j\alpha_{n2}W_{M,n2}X_{n2}$ in which $\alpha_{n1}W_{M,n1}X_{n1}$ which is obtained by multiplying the orthogonal Hadamard sequence $W_{M,n1}$ with the first data $X_{n1}$ of the n-th block and the gain $\alpha_{n1}$ and $\alpha_{n2}W_{M,n2}X_{n2}$ which is obtained by multiplying the orthogonal Hadamard sequence $W_{M,n2}$ with the second data $X_{n2}$ of the n-th block and the gain $\alpha_{n2}$ and $W_{M,n3}+W_{M,n4}$ using the complex multiplier; a summing unit for summing only the in-phase information outputted from each block of the plurality of the complex multiplication blocks and summing only the quadrature-phase information; and a spreading unit for multiplying the in-phase information and the quadrature-phase information summed by the summing unit with the spreading code and outputting an I channel and a Q channel.

In order to achieve the above objects, there is provided an orthogonal complex spreading apparatus according to a second embodiment of the present invention which includes first and second Hadamard sequence multipliers for allocating the multichannel to a predetermined number of channels, splitting the same into two groups and outputting $\alpha_{n1}W_{M,n1}X_{n1}$ which is obtained by multiplying the data $X_{n1}$ of each channel by the gain $\alpha_{n1}$ and the orthogonal Hadamard sequence $W_{M,n1}$;

a first adder for outputting $$\sum_{n=1}^{K}(\alpha_{n1}W_{M,n1}X_{n1})$$

which is obtained by summing the output signals from the first Hadamard sequence multiplier;

a second adder for outputting $$\sum_{n=1}^{K}(\alpha_{n2}W_{M,n2}X_{n2})$$

which is obtained by summing the output signals from the second Hadamard sequence multiplier; a complex multiplier for receiving the output signal from the first adder and the output signal from the second adder in the complex form of $$\sum_{n=1}^{K}(\alpha_{n1}W_{M,n1}X_{n1}+j\alpha_{n2}W_{M,n2}X_{n2})$$

and complex-multiplying $W_{M,j}+jPW_{M,Q}$ which n=1 consist of the orthogonal Hadamard code $W_{M,j}$, and the permutated orthogonal Hadamard code $PW_{M,Q}$ that $W_{M,Q}$ and a predetermined sequence P are complex-multiplied; a spreading unit for multiplying the output signal from the complex multiplier by the spreading code; a filter for filtering the output signal from the spreading unit; and a modulator for multiplying and modulating the modulation carrier wave, summing the in-phase signal and the quadrature-phase signal and outputting a modulation signal of the real number.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a view illustrating an orthogonal Hadamard sequence according to the present invention;

DETAILED DESCRIPTION OF THE INVENTION

The complex summing unit and complex multiplier according to the present invention will be explained with reference to the accompanying drawings. In the present invention, two complexes (a+jb) and (c+jd) are used, where a, b, c and d represent predetermined real numbers.

A complex summing unit outputs (a+c)+j(b+d), and a complex multiplier outputs ((a×c)−(b×d))+j((b×c)+(a×d)). Here, a spreading code sequence is defined as SC, an information data is defined as $X_{n1}$, and $X_{n2}$, a gain constant is defined as $\alpha_{n1}$ and $\alpha_{n2}$, and an orthogonal Hadamard sequence is defined as $W_{M,n1}$, $W_{M,n2}$, $W_{M,n3}$, $W_{M,n4}$, $W_{M,I}$, $W_{M,Q}$, where M represents a M×M Hadamard matrix, and n1, n2, n3 and n4 represents index of a predetermined vector of the Hadamard matrix. For example, n3 represents a Hadamard vector which is a third vector value written into the n-th block like the n-th block 100n of FIG. 4. The Hadamard M represents a Hadamard matrix. For example, if the matrix W has values of 1 and −1, in the $W_T \times W$, the main diagonal terms are M, and the remaining products are zero. Here, T represents a transpose.

The data $X_{n1}$, $X_{n2}$, $W_{M,n1}$, $W_{M,n2}$, $W_{M,n3}$, $W_{M,n4}$, $W_{M,I}$, and $W_{M,Q}$, and SC are combined data consisting of +1 or −1, and any and $\alpha_{n2}$ represent real number.

Figure 4:
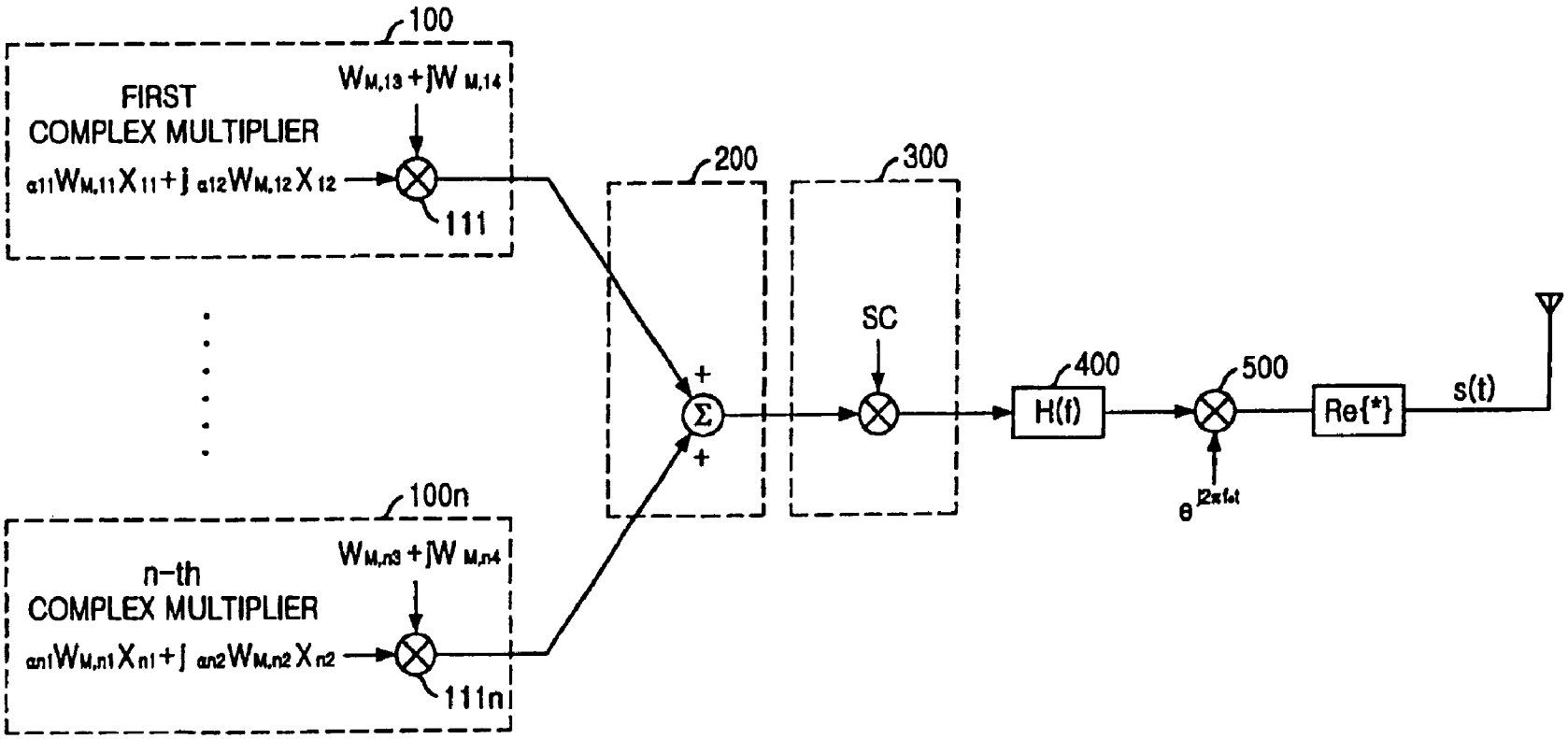
FIG. 4 is a block diagram illustrating a multichannel orthogonal complex spreading apparatus according to the present invention.

FIG. 4 is a block diagram illustrating a multichannel orthogonal complex spreading apparatus according to the present invention.

As shown therein, there is provided a plurality of complex multipliers 100 through 100n in which a data of a predetermined channel is multiplied by a gain and orthogonal Hadamard sequence, and a data of another channel is multiplied by the orthogonal Hadamard sequence for thereby complex-summing two channel data, the orthogonal Hadamard sequence of the complex type is multiplied by the complex-summed data, and the data of other two channels are complex-multiplied in the same manner described above. A summing unit 200 sums and outputs the output signals from the complex multipliers 100 through 100n. A spreading unit 300 multiplies the output signal from the summing unit 200 with a predetermined spreading code SC for thereby spreading the signal. A pulse shaping filter 400 filters the data spread by the spreading unit 300. A modulation wave multiplier 500 multiplies the output signal from the filter 400 with a modulation carrier wave and outputs the modulated data through an antenna.

As shown in FIG. 4, the first complex multiplier 100 complex-sums $\alpha_{11}W_{M,11}X_{11}$ which is obtained by multiplying the orthogonal Hadamard sequence $W_{M,11}$ with the data $X_{11}$ of one channel and the gain $\alpha_{11}$ and $\alpha_{12}W_{M,12}X_{12}$ which is obtained by multiplying the orthogonal Hadamard sequence $W_{M,12}$ with the data $X_{12}$ of another channel and the gain $\alpha_{12}$, and complex-multiplies $\alpha_{11}W_{M,11}X_{11}+j\alpha_{12}W_{M,12}X_{12}$ and the complex-type orthogonal sequence $W_{M,13}X_{11}+jW_{M,14}$ using the complex multiplier 111.

In addition, the n-th complex multiplier 100n complex-sums $\alpha_{n1}W_{M,n1}X_{n1}$ which is obtained by multiplying the orthogonal Hadamard sequence $W_{M,n1}$ with the data $X_{n1}$ of another channel and the gain $\alpha_{n1}$ and $\alpha_{n2}W_{M,n2}X_{n2}$ which is obtained by multiplying the orthogonal Hadamard sequence $W_{M,n2}$ with the data $X_{n2}$ of another channel and the gain $\alpha_{n2}$, and complex-multiplies $\alpha_{n1}W_{M,n1}X_{n1}+j\alpha_{n2}W_{M,n2}X_{n2}$ and the complex-type orthogonal sequence $W_{M,n3}X_{11}+jW_{M,n4}$ using the complex multiplier 100n.

The complex multiplication data outputted from the n-number of the complex multipliers are summed by the summing unit 200, and the spreading code SC is multiplied and spread it by the spreading unit 300. The thusly spread data are filtered by the pulse shaping filter 600, and the modulation carried $e^{/2\pi fct}$ is multiplied by the multiplier 700, and then the function Re{*} is processed, and the real data s(t) is outputted through the antenna. Here, Re{*} represents that a predetermined complex is processed to a real value through the Re{*} function.

The above-described function will be explained as follows:

$$\left(\sum_{n=1}^{K}((\alpha_{n1}W_{M,n1}X_{n1}+j\alpha_{n2}W_{M,n2}X_{n2})\otimes(W_{M,n3}+jW_{M,n4}))\right)\otimes SC$$

where K represents a predetermined integer greater than or equal to 1, n represents an integer greater than or equal to 1 and less than K and is identical with each channel number of the multichannel.

Each of the complex multipliers 110 through 100n is identically configured so that two different channel data are complex-multiplied.

Figure 5A:
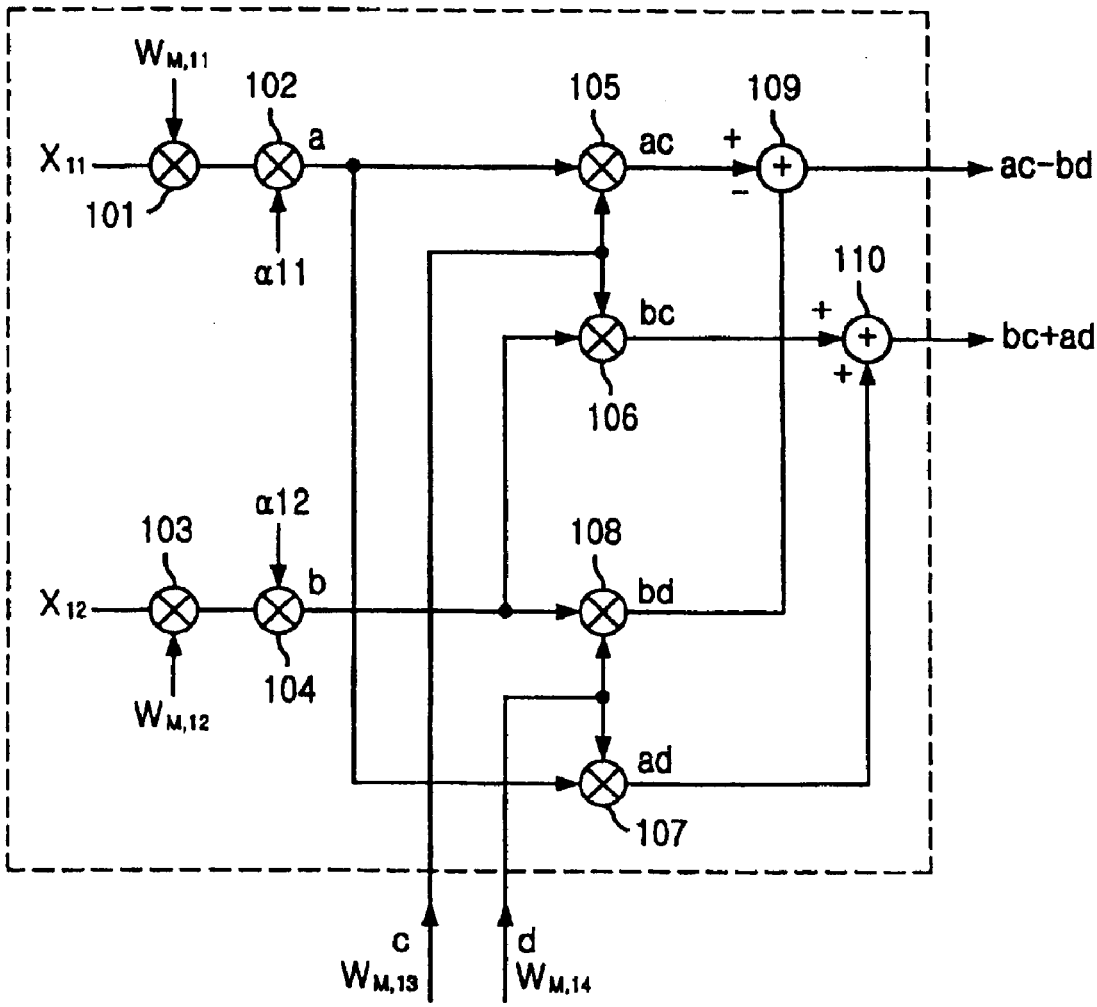
FIG. 5A is a circuit diagram illustrating the complex multiplexor of FIG. 4.

As shown in FIG. 5A, one complex multiplier includes a first multiplier 101 for multiplying the data $X_{11}$ by the orthogonal Hadamard sequence $W_{M,11}$ a second multiplier for multiplying the input signal from the first multiplier by the gain $\alpha_{11}$, a third multiplier 103 for multiplying the data $X_{12}$ of the other channel by another orthogonal Hadamard sequence $W_{M,12}$, a fourth multiplier 104 for multiplying the output signal from the third multiplier 103 by the gain $\alpha_{12}$, fifth and sixth multipliers 105 and 106 for multiplying the output signals $\alpha_{11}W_{M,11}X_{11}$ from the second multiplier 102 and the output signals $\alpha_{11}W_{M,12}X_{12}$ from the fourth multiplier 102 by the orthogonal Hadamard sequence $W_{M,13}$, respectively, seventh and eighth multipliers 107 and 108 for multiplying the output signal $\alpha_{11}W_{M,11}X_{11}$ from the second multiplier 102 and the output signal $\alpha_{12}W_{M,12}X_{12}$ from the fourth multiplier 102 by the orthogonal Hadamard sequence $W_{M,14}$, sequentially, a first adder 109 for summing the output signal (+ac) from the fifth multiplier 105 and the output signal (−bd) from the eighth multiplier 108 and outputting in-phase information (ac−bd), and a second adder 110 for summing the output signal (bc) from the sixth multiplier 106 and the output signal (ad) from the seventh multiplier 107 and outputting the quadrature-phase information (bc+ad).

Therefore, the first and-second multipliers 101 and 102 multiply the data $X_{11}$ by the orthogonal Hadamard sequence $W_{M,11}$ and the gain $\alpha_{11}$ for thereby obtaining $\alpha_{11}W_{M,11}X_{11}$ (−a). In addition, the third and fourth multipliers 103 and 104 multiply the orthogonal Hadamard sequence $W_{M,12}$ and the gain $\alpha_{12}$ for thereby obtaining $\alpha_{12}W_{M,12}X_{12}$ (=b). The fifth and sixth multipliers 105 and 106 multiply $\alpha_{11}W_{M,11}X_{11}$ (=a) and $\alpha_{12}W_{M,12}X_{12}$ (=b) by the orthogonal Hadamard sequence $W_{M,13}$ (=c), respectively, for thereby obtaining $\alpha_{11}W_{M,11}X_{11}W_{M,13}$ (=ac) and $\alpha_{12}W_{M,12}X_{12}W_{M,13}$ (=bc), and the fifth and sixth multipliers 105 and 106 multiply $\alpha_{11}W_{M,11}X_{11}$ (=a) and $\alpha_{12}W_{M,12}X_{12}$ (=b) by the orthogonal Hadamard sequence $W_{M,14}$ (=d) for thereby obtaining $\alpha_{11}W_{M,11}X_{11}W_{M,14}$ (=ad) and $\alpha_{12}W_{M,12}X_{12}W_{M,14}$ (=bd). In addition, the first adder 109 computes $(\alpha_{11}W_{M,11}X_{11}W_{M,13})-(\alpha_{12}W_{M,12}X_{12}W_{M,14})$ (=ac−bd), namely, $\alpha_{12}W_{M,12}X_{12}W_{M,14}$ is subtracted from $\alpha_{11}W_{M,11}X_{11}W_{M,13}$. In addition, the second adder 110 computes $(\alpha_{11}W_{M,11}X_{11}W_{M,14})+(\alpha_{12}W_{M,12}X_{12}W_{M,13})$ (ad+bc), namely, $\alpha_{11}W_{M,11}X_{11}W_{M,14}$ (=ad) is added with $\alpha_{12}W_{M,12}X_{12}W_{M,13}$ (=bc).

FIG. 4 illustrates the first complex multiplier 100 which is configured identically with the n-th complex multiplier 100n. Assuming that $\alpha_{11}W_{M,11}X_{11}$ is "a", $\alpha_{12}W_{M,12}X_{12}$ is "b". the orthogonal Hadamard sequence $W_{M,13}$ is "c", and the orthogonal Hadamard sequence $W_{M,14}$ is "d", the expression "(a+jb) (c+jd)=ac−bd+j (bc+ad)" is obtained. Therefore, the signal outputted from the first complex multiplier 100 becomes the in-phase information "ac−bd" and the quadrature-phase information "bc+ad".

Figure 5B:
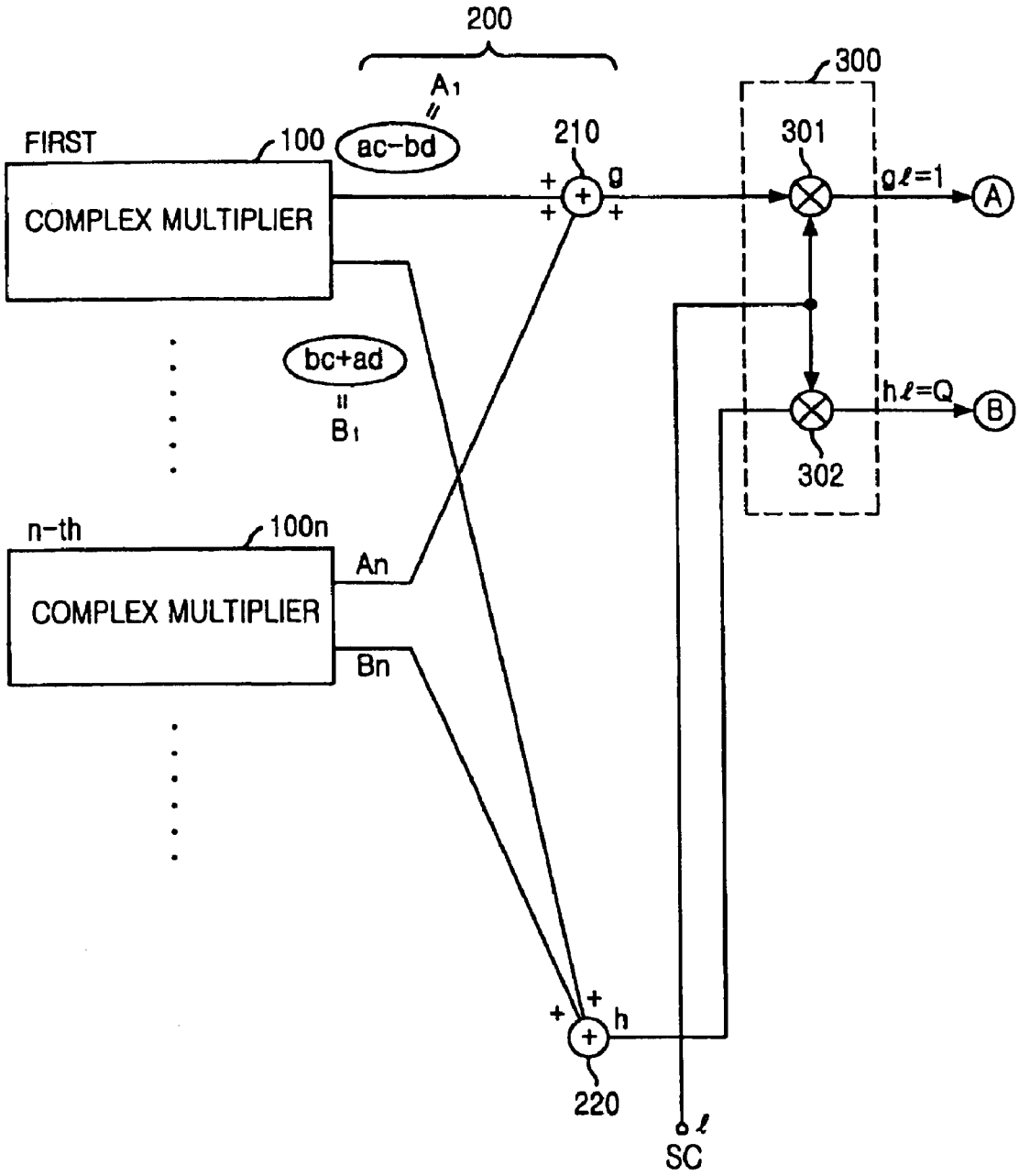
FIG. 5B is a circuit diagram illustrating the summing unit and spreading unit of FIG. 4.
Figure 5C:
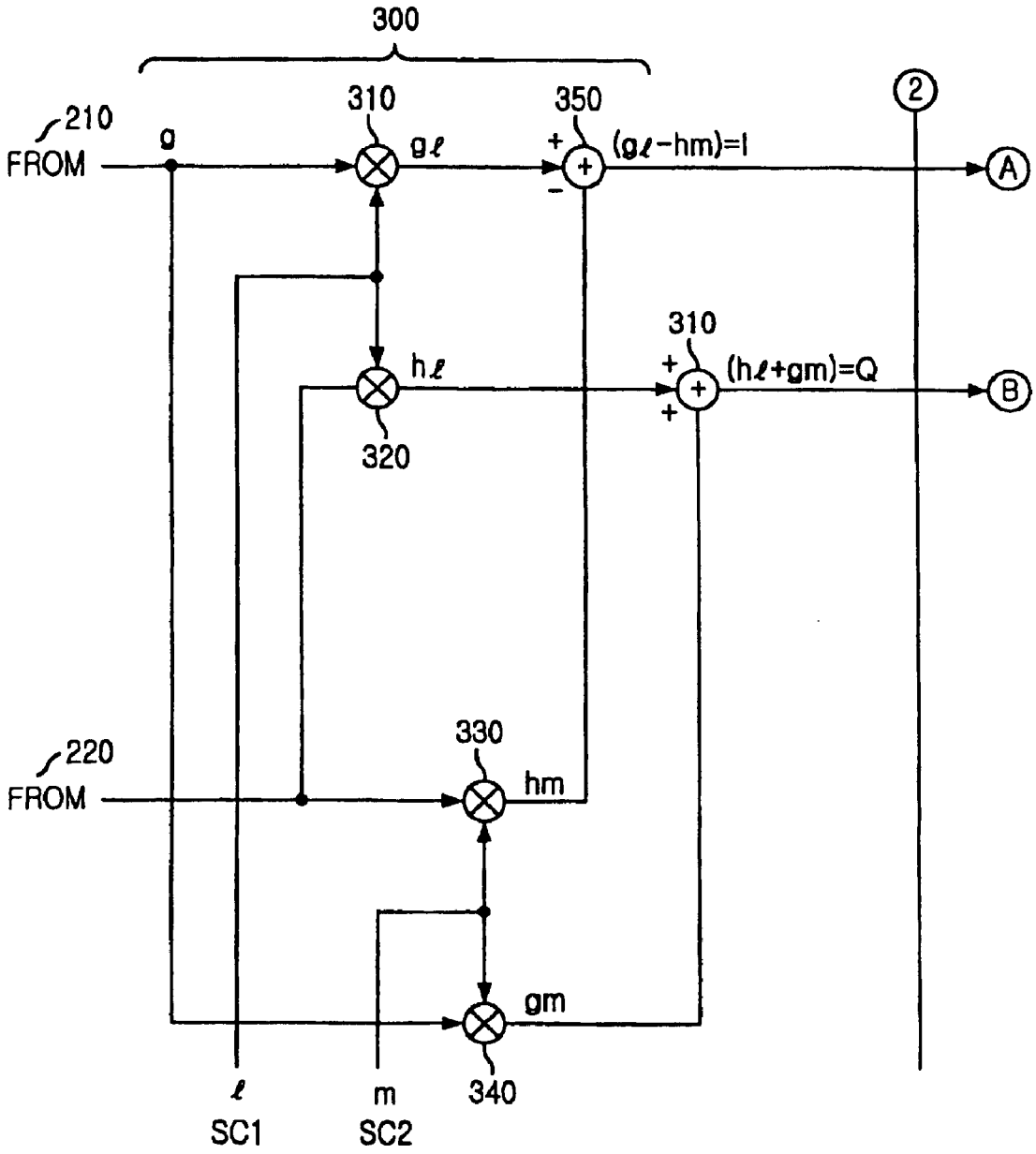
FIG. 5C is a circuit diagram illustrating another embodiment of the spreading unit of FIG. 4.

In addition, FIG. 5B is a circuit diagram illustrating the summing unit and spreading unit of FIG. 4, and FIG. 5C is a circuit diagram illustrating another embodiment of the spreading unit of FIG. 4.

As shown therein, the summing unit 200 includes a first summing unit 210 for summing the in-phase information $A_1$(=(ac−bd), . . . , An outputted from a plurality of complex multipliers, and a second summing unit 220 for summing the quadrature-phase information $B_1$(=bc+ad) outputted from the complex multipliers.

The spreading unit 300 includes first and second multipliers 301 and 302 for multiplying the output signals from the first adder 210 and the second adder 220 of the summing unit 200 by the spreading sequence SC, respectively. Namely, the signals are spread to the in-phase signal (I channel signal) and the quadrature-phase signal (Q channel signal) using one spreading code SC.

In addition, as shown in FIG. 5C, the spreading unit 300 includes first and second multipliers 310 and 320 for multiplying the output signals from the first and second adders 210 and 220 of the summing unit 200 by the spreading sequence SC1, third and fourth multipliers 330 and 340 for multiplying the output signals from the first and second adders 210 and 220 by a spreading sequence SC2, respectively, a first adder 350 for summing the output signal (+) from the first multiplier 310 and the output signal (−)

from the third multiplier 330 and outputting an I channel signal, and a second summing unit 360 for summing the output signal (+) from the second multiplier 320 and the output signal (+) from the fourth multiplier 340 and outputting a Q channel signal.

Namely, in the summing unit 200, the in-phase information and the quadrature-phase information of the n-number of the complex multipliers are summed by the first and second summing units 210 and 220. In the spreading unit 300, the in-phase information summing value (g) and the quadrature phase information summing value (h) from the summing unit 200 are multiplied by the first spreading code SC1 (1) by the first and second multipliers 310 and 320 for thereby obtaining g1 and h1, and the in-phase information summing value (g) and the quadrature phase information summing value (h) from the summing unit 200 are multiplied by the second spreading code SC2(m) by the third and fourth multipliers 330 and 340 for thereby obtaining gm and hm, and the first adder 350 computes gl−hm in which hm is subtracted from gl, and the second adder 360 computes hl+gm in which hl is added by gm.

Figure 5D:
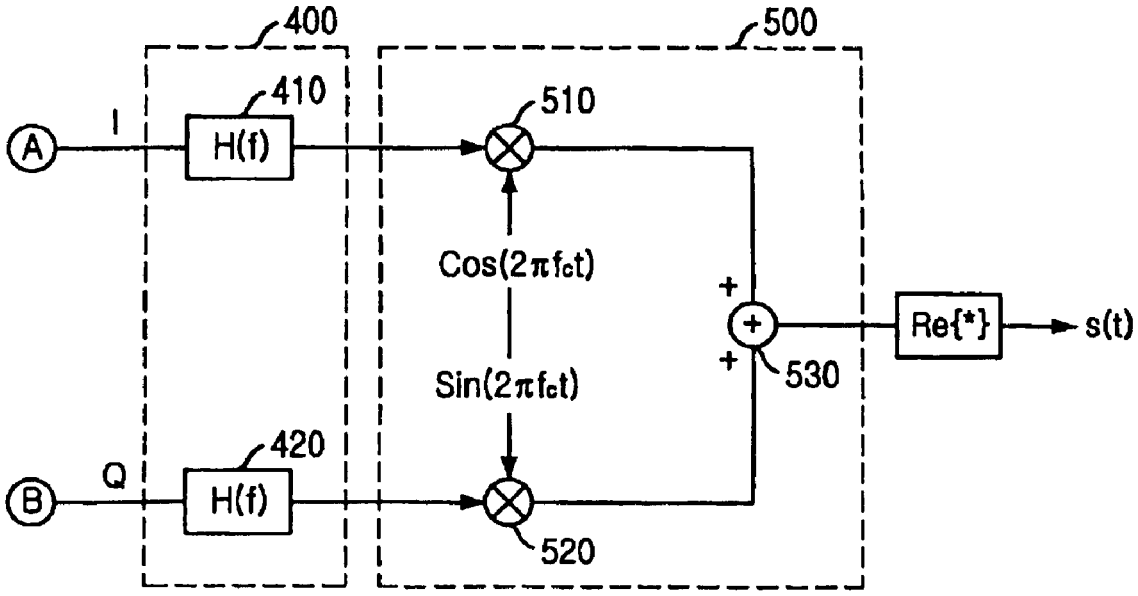
FIG. 5D is a circuit diagram illustrating of the filter and modulator of FIG. 4.

As shown in FIG. 5D, the filter 400 includes first and second pulse shaping filters 410 and 420 for filtering the I channel signal which is the in-phase information shown in FIGS. 5B and 5C and the Q channel signal which is the quadrature phase information signal. The modulation unit 500 includes first and second multipliers 510 and 520 for multiplying the output signals from the first and second pulse shaping filters 410 and 420 by $\cos(2\pi f_c t)$ and $\sin(2\pi f_c t)$, and an adder 530 for summing the output signals from the multipliers 510 and 520 and outputting a modulation data S(t).

Here, the orthogonal Hadamard sequences may be used as a Walsh code or other orthogonal code.

For example, from now on, the case that the orthogonal Hadamard sequence is used for the 8×8 Hadamard matrix shown in FIG. 8 will be explained.

FIG. 8 illustrates an example of the Hadamard (or Walsh) code. Namely, the case that the sequence vector of a k-th column or row is set to $W_{k-1}$ based on the 8×8 Hadamard matrix is shown therein. In this case, if k is 1, $W_{k-1}$ represents $W_0$ of the column or row, and if k is 5, $W_{k-1}$ represents $W_4$ of the column or row.

Therefore, in order to enhance the efficiency of the present invention, the orthogonal Hadamard sequence which multiplies each channel data is determined as follows.

In the M×M Hadamard matrix, the sequence vector of the k-th column or row is set to $W_{k-1}$, and $W_{M,n1}=W_0$, $W_{M,n2}=W_{2p}$ (where p represents a predetermined number of (M/2)−1), and $W_{M,n3}=W_{2n-2}$, $W_{M,n4}=W_{2n-1}$ (where n represents the number of n-th blocks), and $\alpha_{n1}W_0X_{n1}+j\alpha_{n2}W_{2p}X_{n2}$ and $W_{2n-2}+jW_{2n-1}$. The case that only first complex multiplier is used in the embodiment of FIG. 4, namely, the data of two channels are complex-multiplied will be explained. In the M×M (M=8) Hadamard matrix, if the k-th column or row sequence vector is set to $W_{k-1}$, it is possible to determine $W_{M,11}=W_0$, $W_{M,12}=W_2$, or $W_{M,12}=W_4$, and $W_{M,13}=W_0$, $W_{M,14}=W_1$. In addition, it is possible to complex-multiply $\alpha_{11}W_0X_{11}+j\alpha_{12}W_2X_{12}$ or $\alpha_{11}W_0X_{11}+j\alpha_{12}W_4X_{12}$ and $W_0+jW_1$.

In the case that two complex multipliers shown in FIG. 4 are used, the second complex multiplier determines $W_{M,21}=W_0$, $W_{M,22}=W_4$, and $W_{M,23}=W_2$, and $W_{M,24}=W_3$, so that it is possible to complex-multiply $\alpha_{21}W_0X_{21}+j\alpha_{22}W_4X_{22}$ and $W_2+jW_3$.

In addition, as shown in FIG. 5, when the spreading is implemented by using the spreading code SC, one spreading code may be used, and as shown in FIG. 5C, two spreading codes SC1 and SC2 may be used for thereby implementing the spreading operation.

In order to achieve the objects of the present invention, the orthogonal Hadamard sequence directed to multiplying each channel data may be determined as follows.

The combined orthogonal Hadamard sequence may be used instead of the orthogonal Hadamard sequence for removing a predetermined phase dependency based on the interference generated in the multiple path type of self-signal and the interference generated by other users.

For example, in the case of two channels, when the sequence vector of the k-th column or row is set to $W_{k-1}$ in the M×M (M=8) Hadamard matrix, and the sequence vector of the m-th column or row is set to $W_m$, the first M/2 or the last M/2 is obtained based on the vector $W_{k-1}$ and the last M/2 or the first M/2 is obtained based on $W_{m-1}$, so that the combined orthogonal Hadamard vector is set to $W_{k-1//m-1}$, and $W_{M,11}=W_0$, $W_{M,12}=W_{4//1}$, $W_{M//}=W_0$, $W_{M,Q=W1/4}$ are determined, so that it is possible to complex-multiply $\alpha_{11}W_0X_{11}+j\alpha_{12}W_{4//1}X_{11}$ and $W_0+jPW_{1//4}$.

In the case of three channels, the sequence vector of the k-th column or row is set to $W_{k-1}$ based on the M×M (M=8) Hadamard matrix, and the sequence vector of the m-th column or row is set to $W_M$, so that the first M/2 or the last M/2 is obtained from the vector $W_{k-1}$, and the last M/2 or the first M/2 is obtained from $W_{m-1}$, and the combined orthogonal Hadamard vector is set to $W_{k-1//m-1}$, and the summed value of $\alpha_{11}W_0X_{11}+j\alpha_{12}W_{4//1}X_{12}$ and $\alpha_{21}W_2X_{21}$ and $W_0+jPW_{1//4}$ are complex multiplied based on $W_{M,11}=W_0$, $W_{M,12}=W_{4//1}$, $W_{M,21}=W_1$, and $W_{M,I}=W_0$, $W_{M,Q}=W_{1//4}$.

In addition, in the case of two channels, when the sequence vector of the k-th column or row of the M×M (M=8) Hadamard vector matrix is set to $W_{k-1}$, and the sequence vector of the m-th column or row is set to $W_m$, the first M/2 or the last M/2 is obtained from the vector $W_{k-1}$, and the last M/2 or the first M/2 is obtained from $W_{m-1}$, so that the combined orthogonal Hadamard vector is set to $W_{-1//m-1}$, and the summed value of $\alpha_{11}W_0X_{11}+j\alpha_{12}W_{2//1}X_{12}$ and $W_0+jPW_{1//2}$ are complex-multiplied based on $W_{M,11}=W_0$, $W_{M,12}=W_{2//1}$, and $W_{M,I}=W_0$, $W_{M,Q}=W_{1//2}$.

In addition, in the case of three channels, when the sequence vector of the k-th column or row of the M×M (M=8) Hadamard vector matrix is set to $W_{k-1}$, and the sequence vector of the m-th column or row is set to $W_m$, the first M/2 or the last M/2 is obtained from the vector $W_{k-1}$, and the last M/2 or the first M/2 is obtained from $W_{m-1}$, so that the combined orthogonal Hadamard vector is set to $W_{k-1//m-1}$, and the summed value of $\alpha_{11}W_0X_{11}+j\alpha_{12}W_{2//}1X_{12}$ and $\alpha_{21}W_4W_{2l}$ and $W_0+jPW_{1//2}$ are complex-multiplied based on $W_{M,11}=W_0$, $W_{M,12}=W_{2//1}$, $W_{M,21}=W_4$, and $W_{M,I=W0}$, $W_{M,Q}=W_{1//2}$.

Here, so far the cases of two channels and three channels were explained. The cases of two channels and three channels may be selectively used in accordance with the difference of the impulse response characteristic difference of the pulse shaping bandpass filter.

Figure 1:
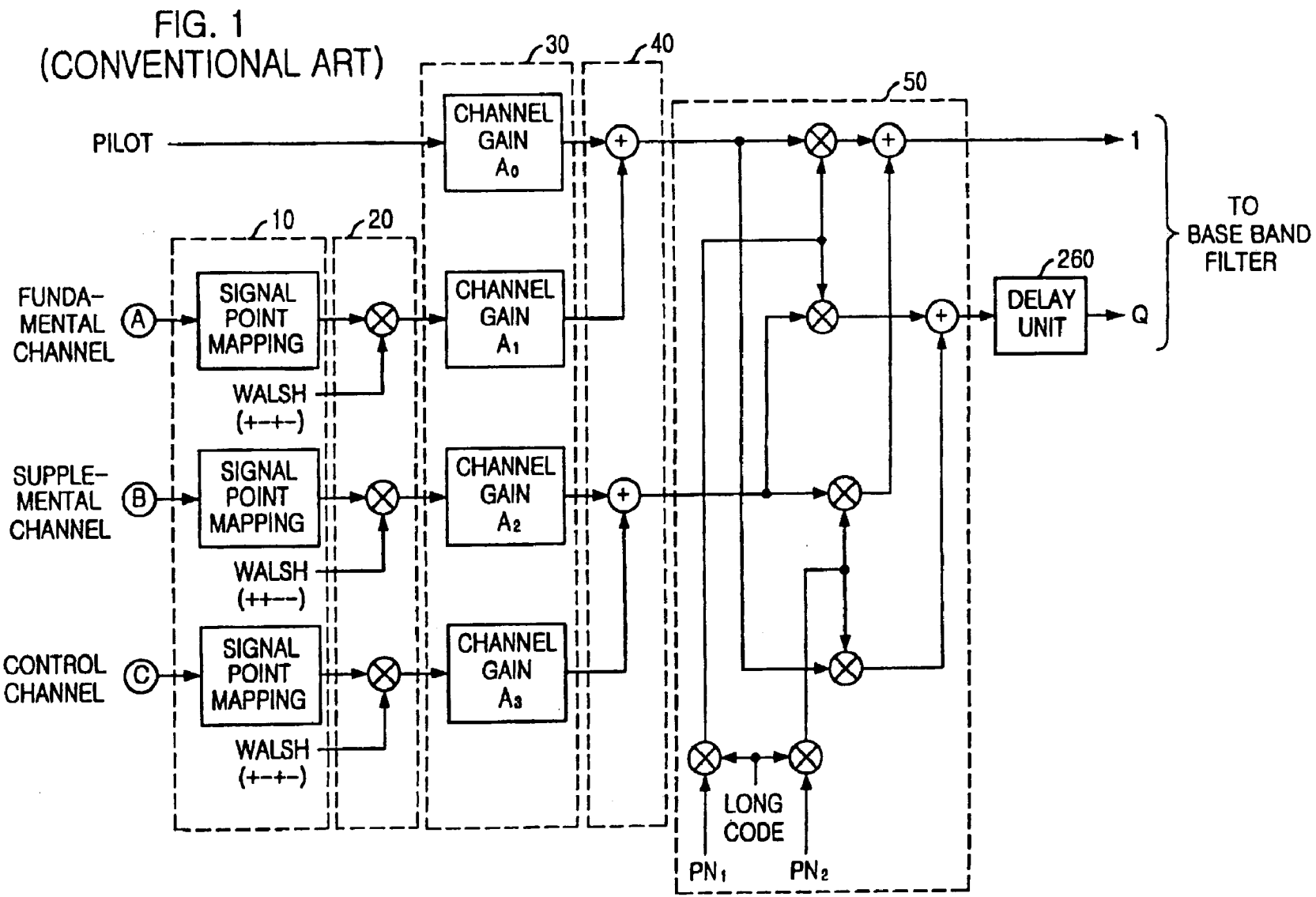
FIG. 1 (CONVENTIONAL ART)
FIG. 1 is a block diagram illustrating a conventional multichannel complex spreading method of a CDMA (Code Division Multiple Access) ONE method.
Figure 2A:
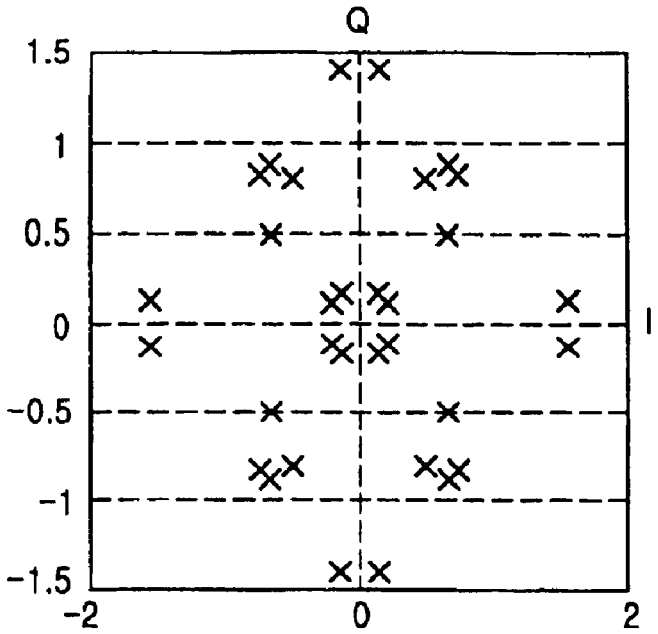
FIG. 2A is a view illustrating a constellation plot of a conventional CDMA ONE method.
Figure 2B:
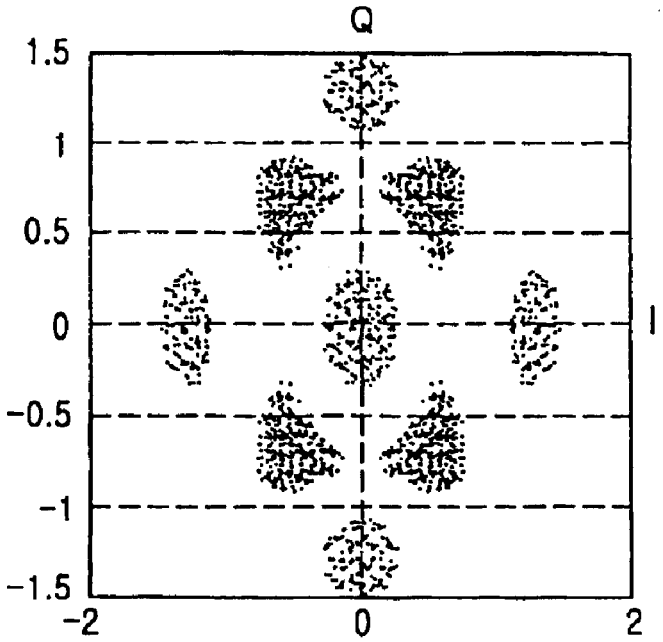
FIG. 2B is a view illustrating a maximum open point after the actual shaping filter of FIG. 2A.
Figure 3A:
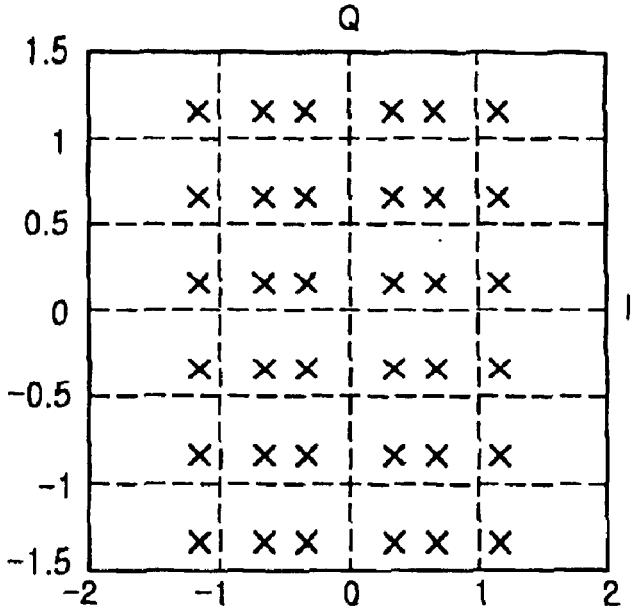
FIG. 3a (CONVENTIONAL ART)
FIG. 3A is a view illustrating a constellation plot of a conventional ETRI version 1.0 method.
Figure 3B:
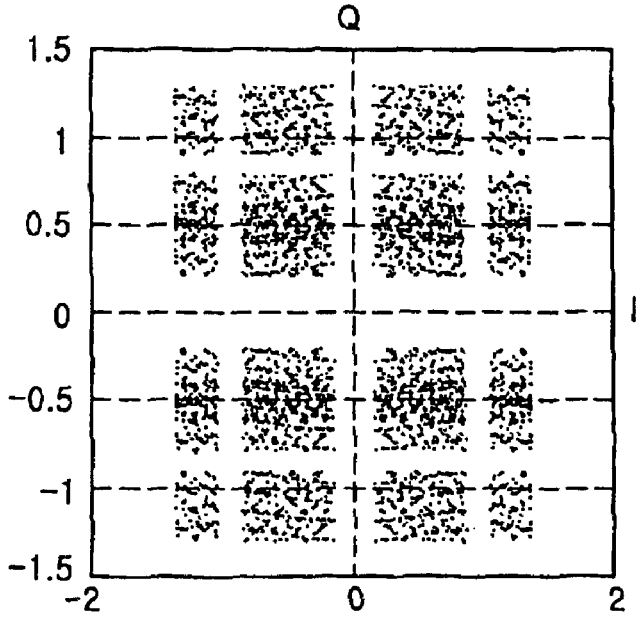
FIG. 3b (CONVENTIONAL ART)
FIG. 3B is a view illustrating a maximum open point after the actual pulse shaping filter of FIG. 3A.
Figure 6A:
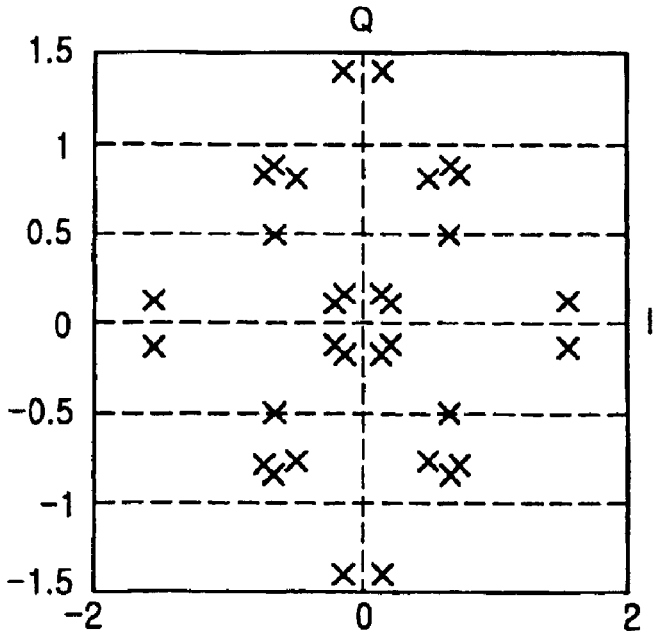
FIG. 6A is a view illustrating a constellation plot of an OCQPSK according to the present invention.
Figure 6B:
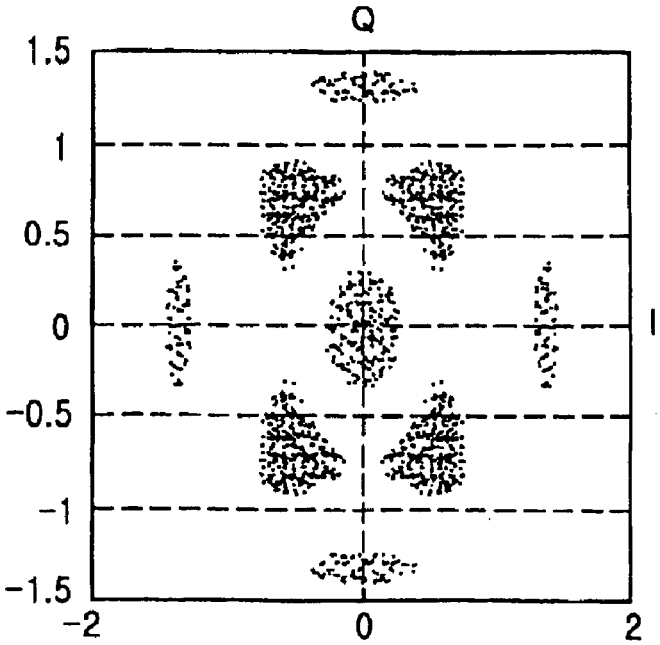
FIG. 6B is a view illustrating a maximum open point after the actual pulse shaping filter of FIG. 6A.
Figure 7:
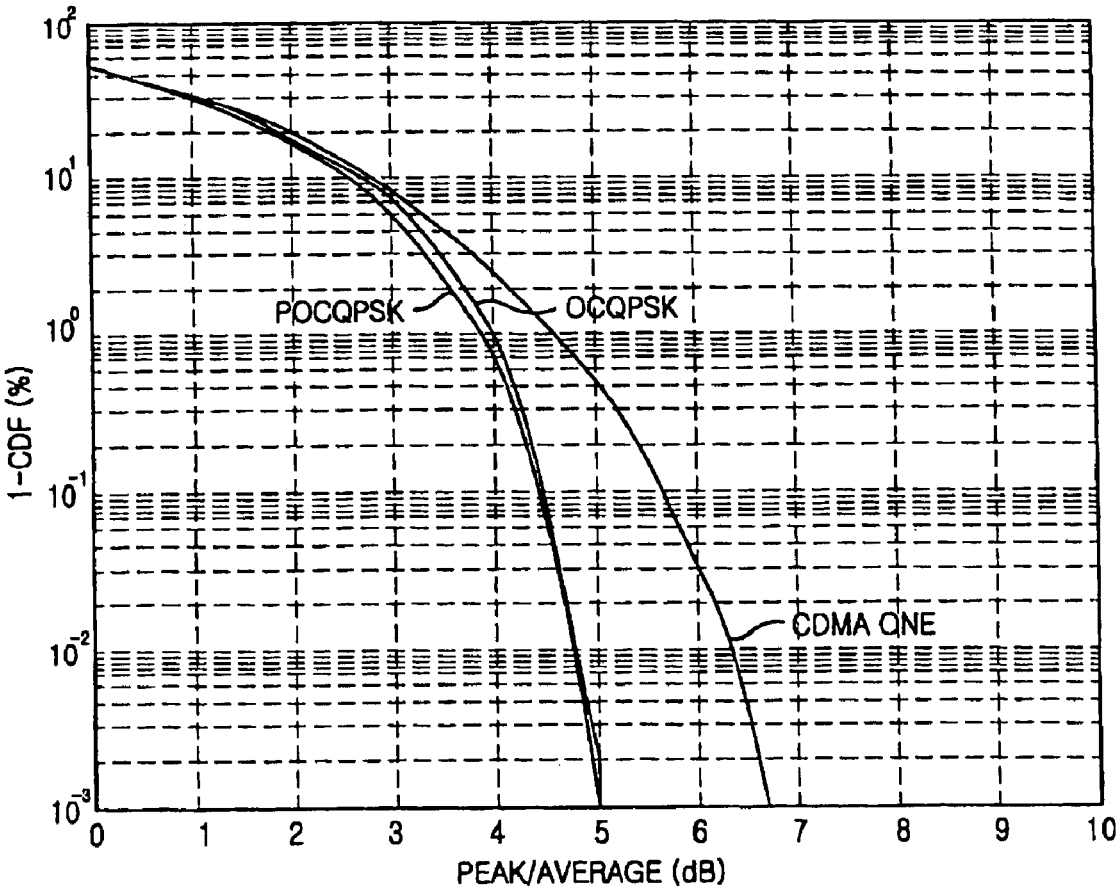
FIG. 7 is a view illustrating a power peak occurrence statistical distribution characteristic with respect to an average power between the conventional art and the present invention.

FIG. 6A is a view illustrating a constellation plot of the OCQPSK according to the present invention, FIG. 6B is a view illustrating a maximum eye-opening point after the actual pulse shaping filter of FIG. 6A, and FIG. 7 is a view illustrating a power peak occurrence statistical distribution characteristic with respect to an average power between the OCQPSK according to the present invention and the conventional CDMA ONE and version ETRI 1.0. As shown therein, the embodiment of FIG. 6A is similar with that of FIG. 2A. However, there is a difference in the point of the maximum eye-opening point after the actual pulse shaping filter. Namely, in FIG. 6B, the range of the upper and lower information (Q channel) and the left and right information (I channel) are fully satisfied. This causes the difference of the statistical distribution of the peak power-to-average power.

FIG. 7 illustrates the peak power-to-average power ratio obtained based on the result of the actual simulation between the present invention and the conventional art.

In order to provide the identical conditions, the power level of the control or signal channel is controlled to be the same as the power level of the communication channel (Fundamental channel, supplemental channel or the In-phase channel and the Quadrature channel), and the power level of the pilot channel is controlled to be lower than the power level of the communication channel by 4 dB. In the above-described state, the statistical distributions of the peak power-to-average power are compared.

In the case of OCQPSK according to the present invention, the comparison is implemented using the first complex multiplier 100 and the n-th complex multiplier 100n shown in FIG. 4. The first block 100 is implemented based on $W_{M,11}=W_0$, $W_{M,12}=W_4$, $W_{M,13}=W_0$, and $W_{M,14}=W_1$, and the n-th block 100n is implemented based on $W_{M,n1}=W_0$, $W_{M,n2}=W_4$, $W_{M,n3}=W_2$, and $W_{M,n4}=W_3$. In addition, the SCI is used as the SC1 for the spreading code. In this case, the SC2 is not used.

In the case of OCQPSK, the probability that the instantaneous power exceeds the average power value (0 dB) by 4 dB is 0.03%, and in the case of CDMA ONE, the same is 0.9%, and in the case of the ETRI version 1.0, the same is 4%. Therefore, in the present invention, the system using the CDMA technique has very excellent characteristic in the peak to average power ratio sense, and the method according to the present invention is a new modulation method which eliminates the cross talk problem.

Figure 9:
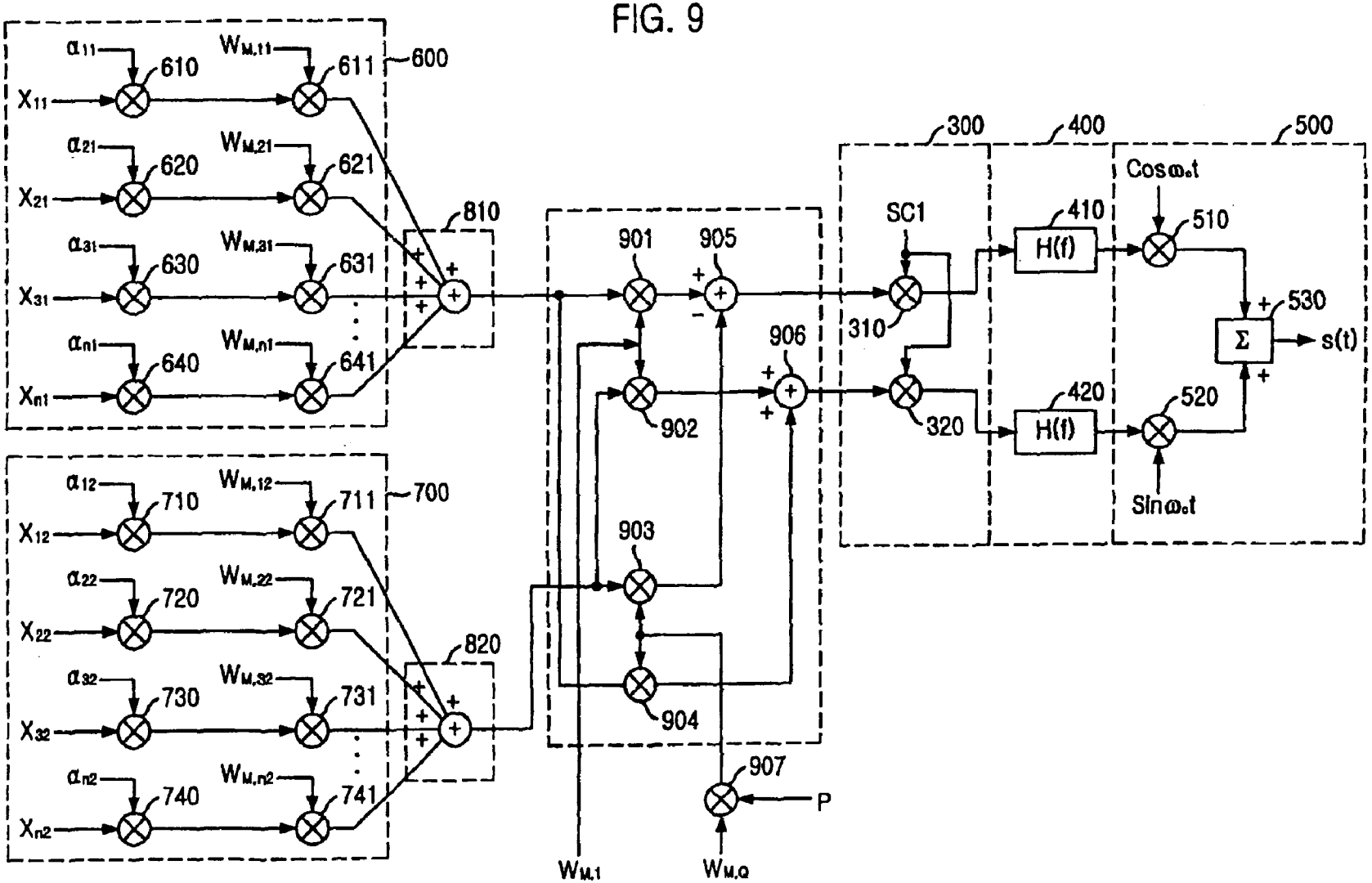
FIG. 9 is a circuit diagram illustrating a multichannel permutated orthogonal complex spreading apparatus according to the present invention.

FIG. 9 illustrates a permutated orthogonal complex spreading modulation (POCQPSK) according to the present invention.

As shown therein, one or a plurality of channels are combined and complex-multiplied by the permutated orthogonal Hadamard code and then are spread by the spreading code.

As shown therein, there are provided first and second Hadamard sequence multipliers 600 and 700 for allocating the multichannel to a predetermined number of channels, splitting the same into two groups and outputting $\alpha_{n1}W_{M,n1}X_{n1}$ which is obtained by multiplying the data $X_{n1}$ of each channel by the gain $\alpha_{n1}$ and the orthogonal Hadamard sequence $W_{M,n1}$, a first adder 810 for outputtin $$\sum_{n=1}^{K}(\alpha_{n1}W_{M,n1}X_{n1})$$

which is obtained by summing the output signals from the first Hadamard sequence multiplier 600, a second adder 820 for outputting $$\sum_{n=1}^{K}(\alpha_{n2}W_{M,n2}X_{n2})$$

which is obtained by summing the output signals from the second Hadamard sequence multiplier 700, a complex multiplier 900 for receiving the output signal from the first adder 810 and the output signal from the second adder 820 in the complex form of $$\sum_{n=1}^{K}(\alpha_{n1}W_{M,n1}X_{n1}+j\alpha_{n2}W_{M,n2}X_{n2})$$

and complex-multiplying $W_{M,I}+jPW_{M,Q}$ which consist of the orthogonal Hadamard code $W_{M,I}$, and the permutated orthogonal Hadamard code $PW_{M,Q}$ that $W_{M,Q}$ and a predetermined sequence P are complex-multiplied, a spreading unit 300 for multiplying the output signal from the complex multiplier 900 by the spreading code, a filter 400 for filtering the output signal from the spreading unit 300, and a modulator 500 for multiplying and modulating the modulation carrier wave, summing the in-phase signal and the quadrature phase signal and outputting a modulation signal of the real number.

Here, the construction of the spreading unit 300, the filter 400 and the modulator 500 is the same as the embodiment of FIG. 4 except for the following construction. Namely, comparing to the embodiment of FIG. 4, in the construction of FIG. 9, the multiplication of the complex type orthogonal Hadamard sequence performed by the complex multipliers 100 through 100n are separated and connected in the rear portion of the summing unit, and the channel-wise multiplication by the complex type orthogonal Harmard sequence is not implemented. Namely, the two group summed signal is multiplied by the complex type orthogonal Hadamard sequence.

The first orthogonal Hadamard sequence multiplier 600 outputs $$\sum_{n=1}^{K}(\alpha_{n1}W_{M,n1}X_{n1})$$

which is summed by the first adder 810 by summing $\alpha_{11}W_{M,11}X_{11}$ which is obtained by the first adder 810 by multiplying the orthogonal Hadamard sequence $W_{M,11}$ by the first data $X_{11}$ of the first block and the gain $\alpha_{11}$, respectively, $\alpha_{21}W_{M,21}X_{21}$ which is obtained by multiplying the orthogonal Hadamard sequence $W_{M,21}$ by the second data $X_{21}$ of the first block and the gain $\alpha_{21}$, respectively, and $\alpha_{n1}W_{M,n1}X_{n1}$ which is obtained by multiplying the orthogonal Hadamard sequence $W_{M,n1}$ by the n-th data $X_{n1}$ of the first block and the gain $\alpha_{n1}$.

The second orthogonal Hadamard sequence multiplier 700 outputs $$\sum_{n=1}^{K}(\alpha_{n2}W_{M,n2}X_{n2})$$

which is summed by the second adder 820 by summing $\alpha_{12}W_{M,12}X_{12}$ which is obtained by multiplying the orthogonal Hadamard sequence $W_{M,12}$ by the first data $X_{12}$ of the second block and the gain $\alpha_{12}$, respectively, $\alpha_{22}W_{M,22}X_{22}$ which is obtained by multiplying the orthogonal Hadamard sequence $W_{M,22}$ by the second data $X_{22}$ of the second block and the gain $\alpha_{22}$, respectively, and $\alpha_{n2}W_{M,n2}X_{n2}$ which is obtained by multiplying the orthogonal Hadamard sequence $W_{M,n2}$ by the n-th data $X_{n2}$ of the second block and the gain $\alpha_{n2}$. Here, the block represents one group split into 1 group.

The signal outputted from the first adder 810 forms an in-phase data, and the signal outputted from the second adder 820 forms an quadrature phase data and outputs $$\sum_{n=1}^{K} (\alpha_{n1} W_{M,n1} X_{n1} + j\alpha_{n2} W_{M,n2} X_{n2}).$$

In addition, the complex multiplier 900 multiplies the complex output signals from the first and second adders 810 and 820 by a complex type signal that is comprised of an orthogonal Harmard code $W_{M,I}$ and $PW_{M,Q}$ which results from the multiplication of the orthogonal Hardmard code $W_{M,Q}$ by the sequence P and outputs an in-phase signal and a quadrature phase signal. Namely, the complex output signals from the first and second adders 810 and 820 are complex-multiplied by the complex type signals of $W_{M,I}+jPW_{M,Q}$ by the complex multiplier.

The spreading unit 300 multiplies the output signal from the complex multiplier 900 by the spreading code SCI and spreads the same. The thusly spread signals are filtered by the pulse shaping filters 410 and 420. The modulation carrier waves of $\cos(2\pi f_c t)$ and $\sin(2\pi f_c t)$ are summed by the modulation multipliers 510 and 520 and then modulated for thereby outputting s(t).

Namely, the following equation is obtained.

$$\left(\sum_{n=1}^{K} (\alpha_{n1} W_{M,n1} X_{n1} + j\alpha_{n2} W_{M,n2} X_{n2})\right) \otimes (W_{M,I} + jPW_{M,Q}) \otimes SCI.$$

where K represents an integer greater than or equal to 1.

Figure 10:
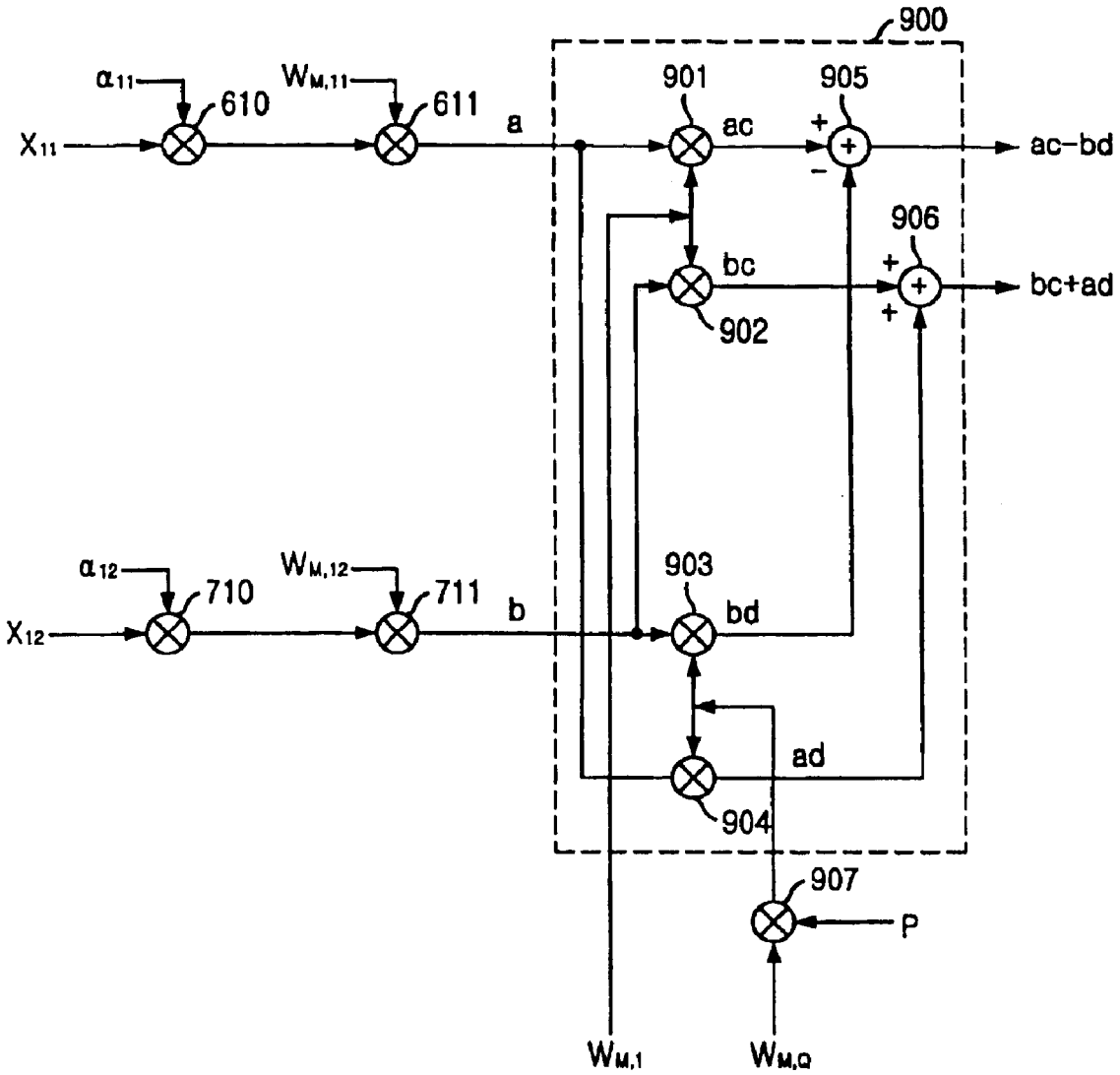
FIG. 10 is a circuit diagram illustrating the complex multiplier according to the present invention.

FIG. 10 illustrates an embodiment that two channel data are complex-multiplied. A channel data $X_{11}$ is allocated to the first orthogonal Hadamard sequence multiplier 600 and another channel data $X_{12}$ is allocated to the second orthogonal Hadamard sequence multiplier 700.

Here, the orthogonal Hadamard sequence multiplier includes a first multiplier 610 for multiplying the first data $X_{11}$ by the gain $\alpha_{11}$, a second multiplier 611 for multiplying the output signal from the first multiplier 610 by the orthogonal Hadamard sequence $W_{M,11}$, a third multiplier 710 for multiplying the second data $X_{12}$ by the gain $\alpha_{12}$, and a fourth multiplier 711 for multiplying the output signal from the third multiplier 710 by the orthogonal Hadamard sequence $W_{M,12}$. At this time, since one channel is allocated to one group, the summing unit is not used.

The complex multiplier 900 includes fifth and sixth multipliers 901 and 902 for multiplying the output signal $\alpha_{11} W_{M,11} X_{11}$ from the second multiplier 611 and the output signal $\alpha_{12} W_{M,12} X_{12}$ from the fourth multiplier 711 by the orthogonal Hadamard sequence $W_{M,I}$, seventh and eighth multipliers 903 and 904 for multiplying the output signal $\alpha_{11} W_{M,11} X_{11}$ from the second multiplier 611 and the output signal $\alpha_{12} W_{M,12} X_{12}$ from the fourth multiplier 711 by the permutated orthogonal Hadamard sequence $PW_{M,Q}$, a first adder 905 for summing the output signal (+ac) from the fifth multiplier 901 and the output signal (−bd) from the seventh multiplier 903 and outputting an in-phase information (ac−bd), and a second adder 906 for summing the output signal (bc) from the sixth multiplier 902 and the output signal (ad) from the eighth multiplier 904 and outputting an quadrature phase information (bc+ad).

Therefore, the first and second multipliers 610 and 611 multiply the data $X_{11}$ by the orthogonal Hadamard sequence $W_{M,11}$ and the gain $\alpha_{11}$ for thereby obtaining $\alpha_{11} W_{M,11} X_{11}$ (=a). In addition, the third and fourth multipliers 710 and 711 multiply the data $X_{12}$ by the orthogonal Hadamard sequence $W_{M,12}$ and the gain $\alpha_{12}$ for thereby obtaining $\alpha_{12} W_{M,12} X_{12}$ (=b). The fifth and sixth multipliers 901 and 902 multiply $\alpha_{11} W_{M,11} X_{11}$ (=a) and $\alpha_{12} W_{M,12} X_{12}$ (=b) by the orthogonal Hadamard sequence $W_{M,I}$ (=c) for thereby obtaining $\alpha_{11} W_{M,11} X_{11} W_{M,I}$ (=ac) and $\alpha_{12} W_{M,12} X_{12} W_{M,i}$ (=bc).

The seventh and eighth multipliers 903 and 904 multiply $\alpha_{11} W_{M,11} X_{11}$ (=a) and $\alpha_{12} W_{M,12} X_{12}$ (=b) by the permutated orthogonal Hadamard sequence $PW_{M,Q}$ for thereby obtaining $\alpha_{11} W_{M,11} X_{11} PW_{M,Q}$ (=ad) and $\alpha_{12} W_{M,12} X_{12} PW_{M,Q}$ (=bd).

In addition, the first adder 905 obtains $(\alpha_{11} W_{M,11} X_{11} W_{M,I}) - (\alpha_{12} W_{M,12} X_{12} PW_{M,Q})$ (=ac−bd), namely, $\alpha_{12} W_{M,12} X_{12PWM,Q}$(bd) is subtracted from $\alpha_{11} W_{M,11} X_{11} W_{M,I}$ (=ac), and the second adder 906 obtains $(\alpha_{11} W_{M,11} X_{11} PW_{M,Q}) + (\alpha_{12} W_{M,12} X_{12} W_{M,I})$ (ad+bc), namely, $(\alpha_{11} W_{M,11} X_{11} PW_{M,Q})$ (=ad) is summed by $(\alpha_{12} W_{M,12} X_{12} W_{M,I})$ (bc).

FIG. 10 illustrates the complex multiplier 900 shown in FIG. 9. Assuming that $\alpha_{11} W_{M,11} X_{11}$ is "a", $\alpha_{12} W_{M,12} X_{12}$ is "b", the orthogonal Hadamard sequence $W_{M,I}$ is "c", and the permutated orthogonal Hadamard sequence $PW_{M,Q}$ is "d", since (a+jb) (c+jd)=ac−bd+jc (bc+ad), the signal from the complex multiplier 900 becomes the in-phase information ac−bd and the quadrature phase information bc+ad.

The in-phase data and the quadrature phase data are spread by the spreading unit 300 based on the spreading code (for example, PN code). In addition, the I channel signal which is the in-phase information and the Q channel signal which is the quadrature phase information signal are filtered by the first and second pulse shaping filters 410 and 420. The first and second multipliers 510 and 520 multiply the output signals from the first and second pulse shaping filters 410 and 420 by $\cos(2\pi f_c t)$ and $\sin(2\pi f_c t)$. The output signals from the multipliers 510 and 520 are summed and modulated by the adder 530 which outputs S(t).

In the embodiment as shown in FIG. 9, identically to the embodiment as shown in FIG. 4, for the orthogonal Hadamard sequence, the Walsh code or other orthogonal code may be used. In addition, in the orthogonal Hadamard sequence of each channel, the sequence vector of the k-th column or row is set to $W_{k-1}$ in the M×M Hadamard matrix. (where p represents a predetermined number in a range from 0 to (M/2)−1.

The orthogonal Hadamard sequence is allocated to each channel based on the above-described operation, and if there remain other channels which are not allocated the orthogonal Hadamard sequence by the above-described operation, and if there remain other channel which are not allocated the orthogonal Hadamard sequence by the above-described operation, then any row or column vector from the Hamard matrix can be selected.

Figure 11:
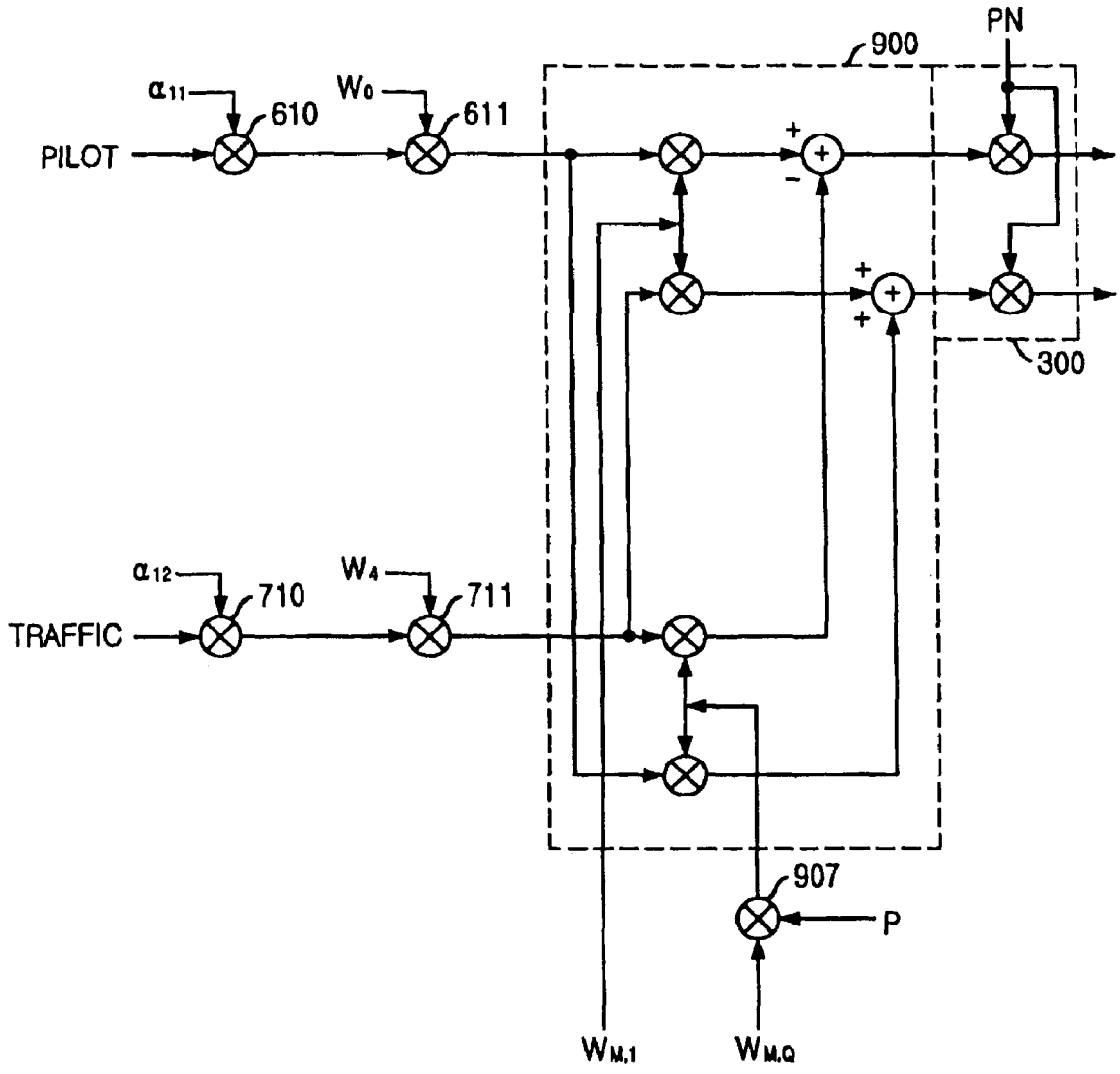
FIG. 11 is a circuit diagram illustrating a multichannel permutated orthogonal complex spreading apparatus for a voice service according to the present invention.

FIG. 11 illustrates an embodiment of the POCQPSK for the voice service. In this case, two channels, namely, the pilot channel and the data of traffic channels are multiplied by the gain and orthogonal Hadamard sequence, and two channel signals are inputted into the complex multiplier 900 in the complex type, and the orthogonal Hadamard sequence of the complex type is multiplied by the complex multiplier 900.

Figure 12:
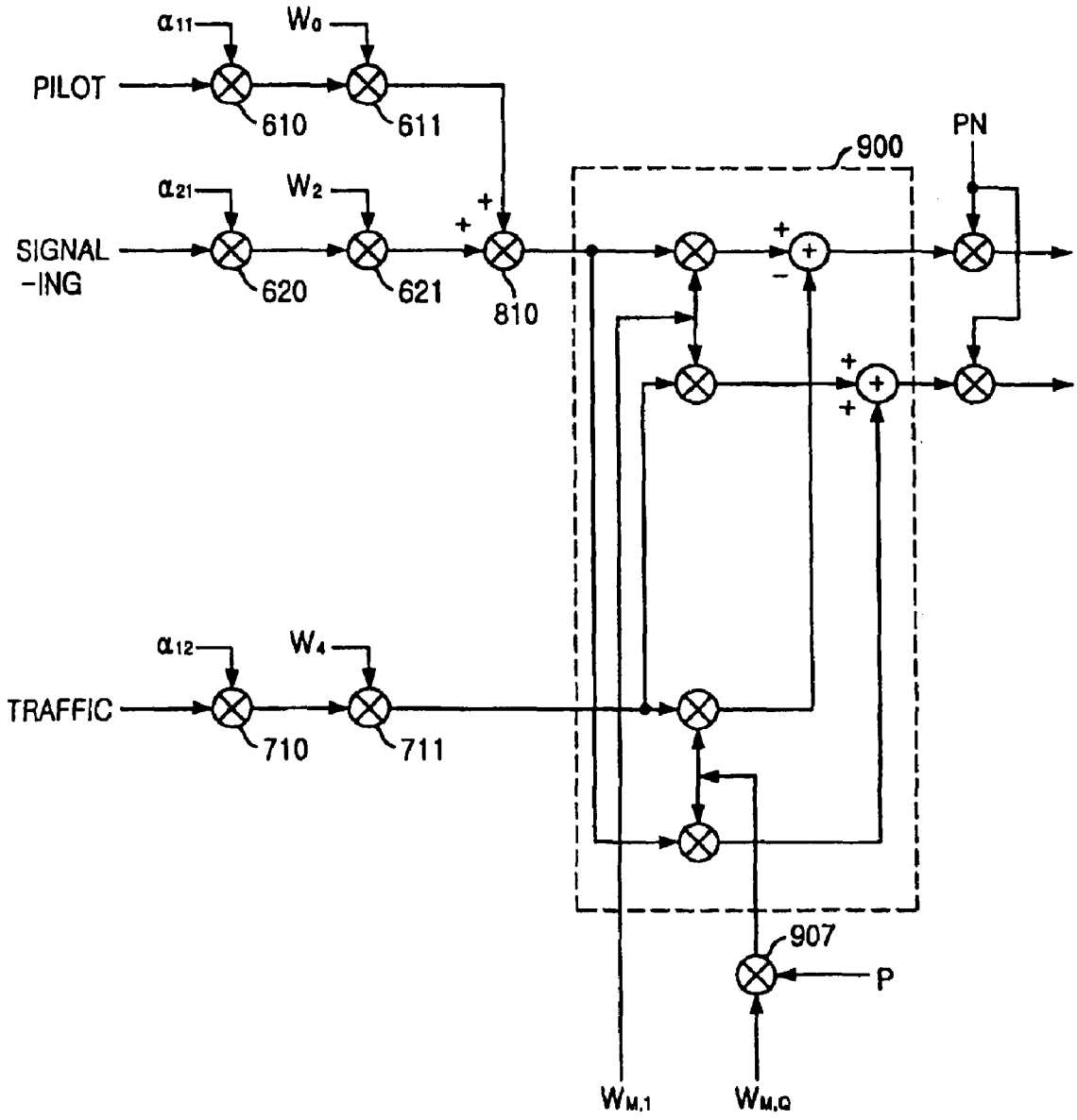
FIG. 12 is a circuit diagram illustrating a multichannel permutated orthogonal complex spreading apparatus having a high quality voice service and a low transmission rate according to the present invention.

FIG. 12 illustrates the construction of a data service having a good quality voice service and low transmission rate. In this case, the pilot channel and signaling channel are allocated to the first orthogonal Hadamard sequence multiplier 700, and the traffic channel is allocated to the second orthogonal Hadamard sequence multiplier 700.

Figure 13A:
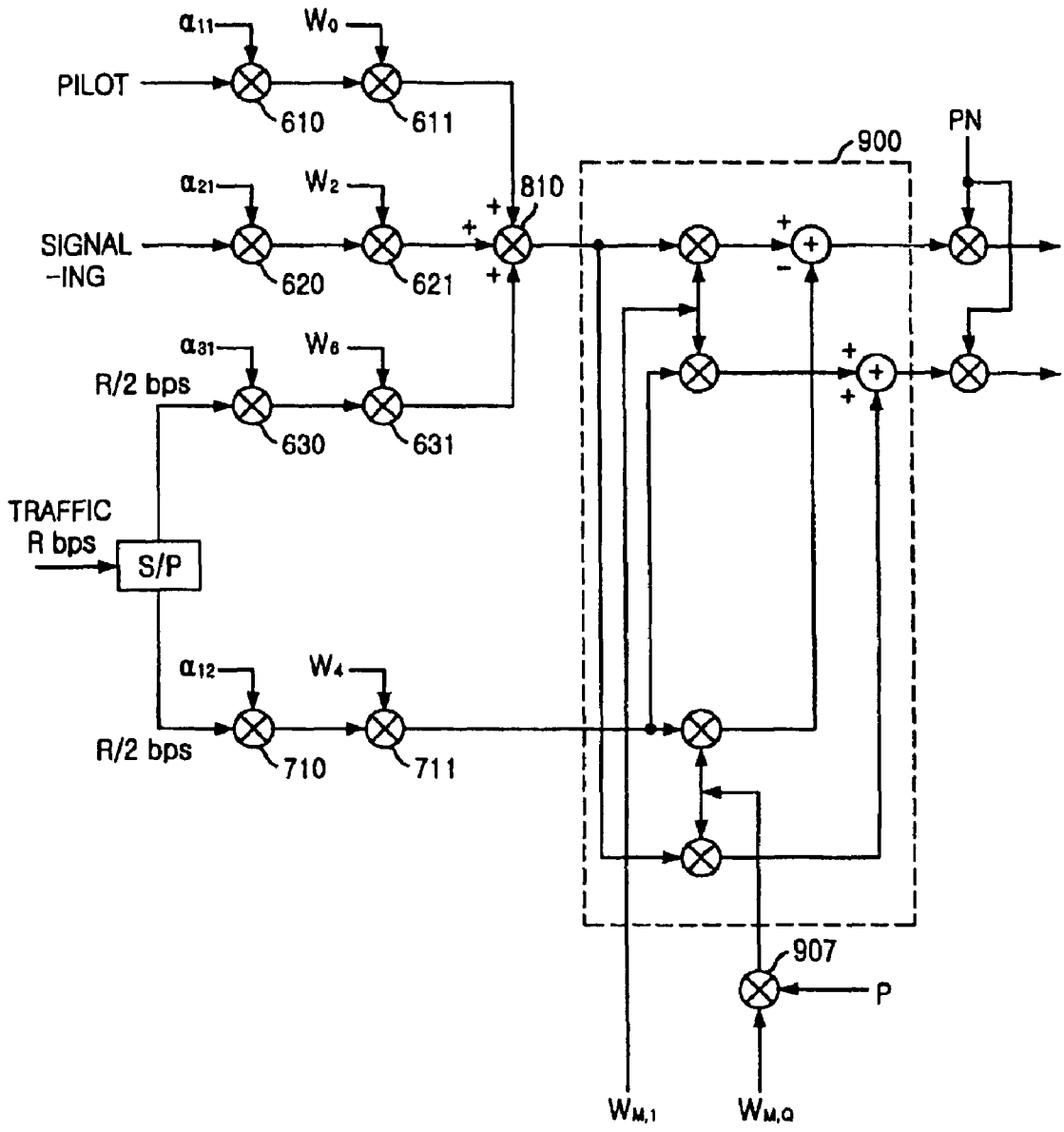
FIG. 13A is a circuit diagram illustrating a multichannel permutated orthogonal complex spreading apparatus for a QPSK having a high transmission rate according to the present invention.
Figure 13B:
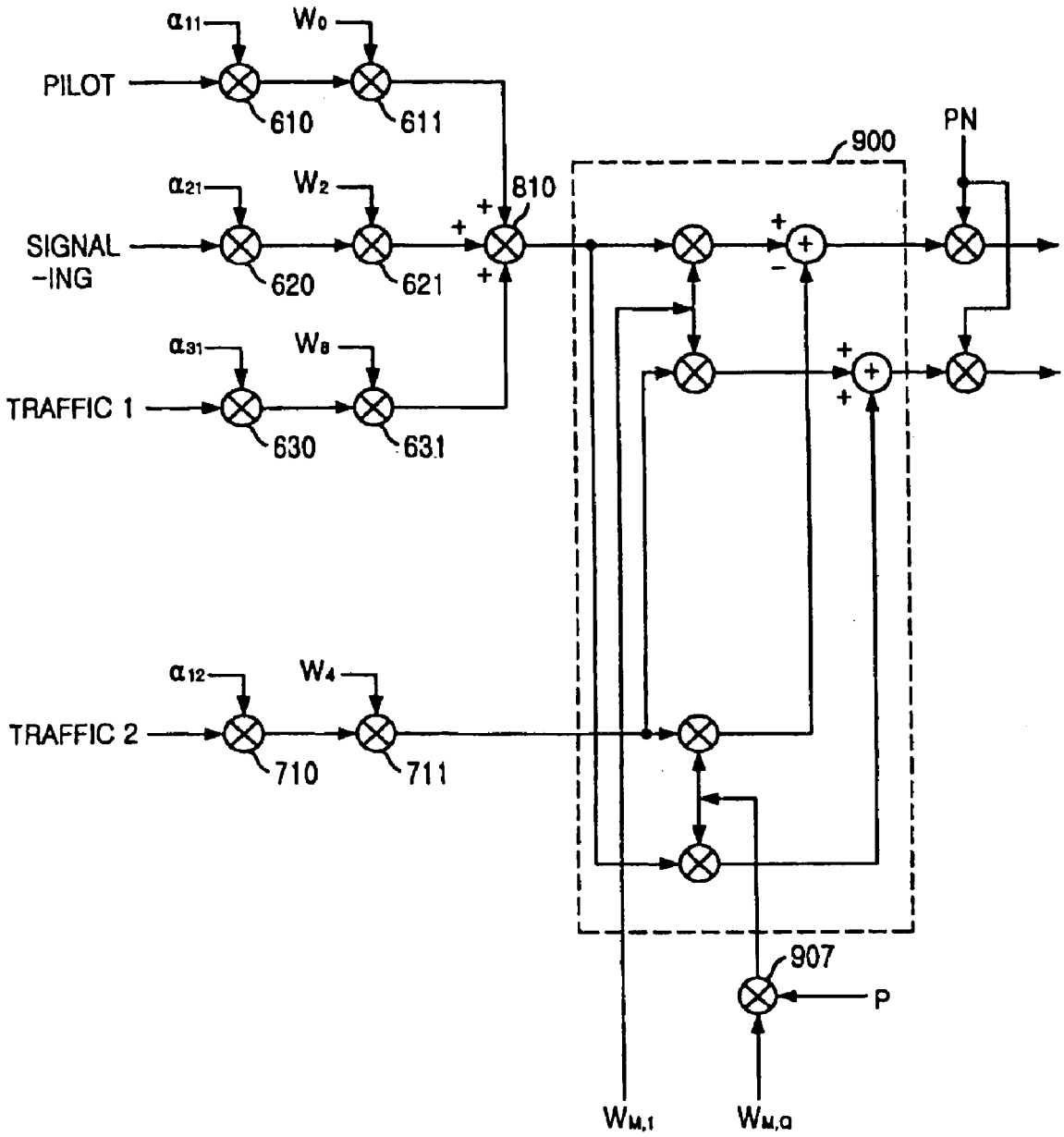
FIG. 13B is a circuit diagram illustrating a multichannel permutated orthogonal complex spreading apparatus for a data having a high transmission rate according to the present invention.

FIG. 13A illustrates the construction for a data service of a high transmission rate. As shown therein, the data transmitted at a rate of R bps has the QPSK data type and are transmitted at R/2 bps through the serial to parallel converter. As shown in FIG. 13B, the system may be constituted so that the input data (traffic 1 and traffic 2) have the identical gains ($\alpha_{31}=\alpha_{12}$). Here, when the data having high transmission rate are separated into two channels, the gain allocated to each channel should be determined to the identical gain for thereby eliminating the phase dependency.

Figure 14A:
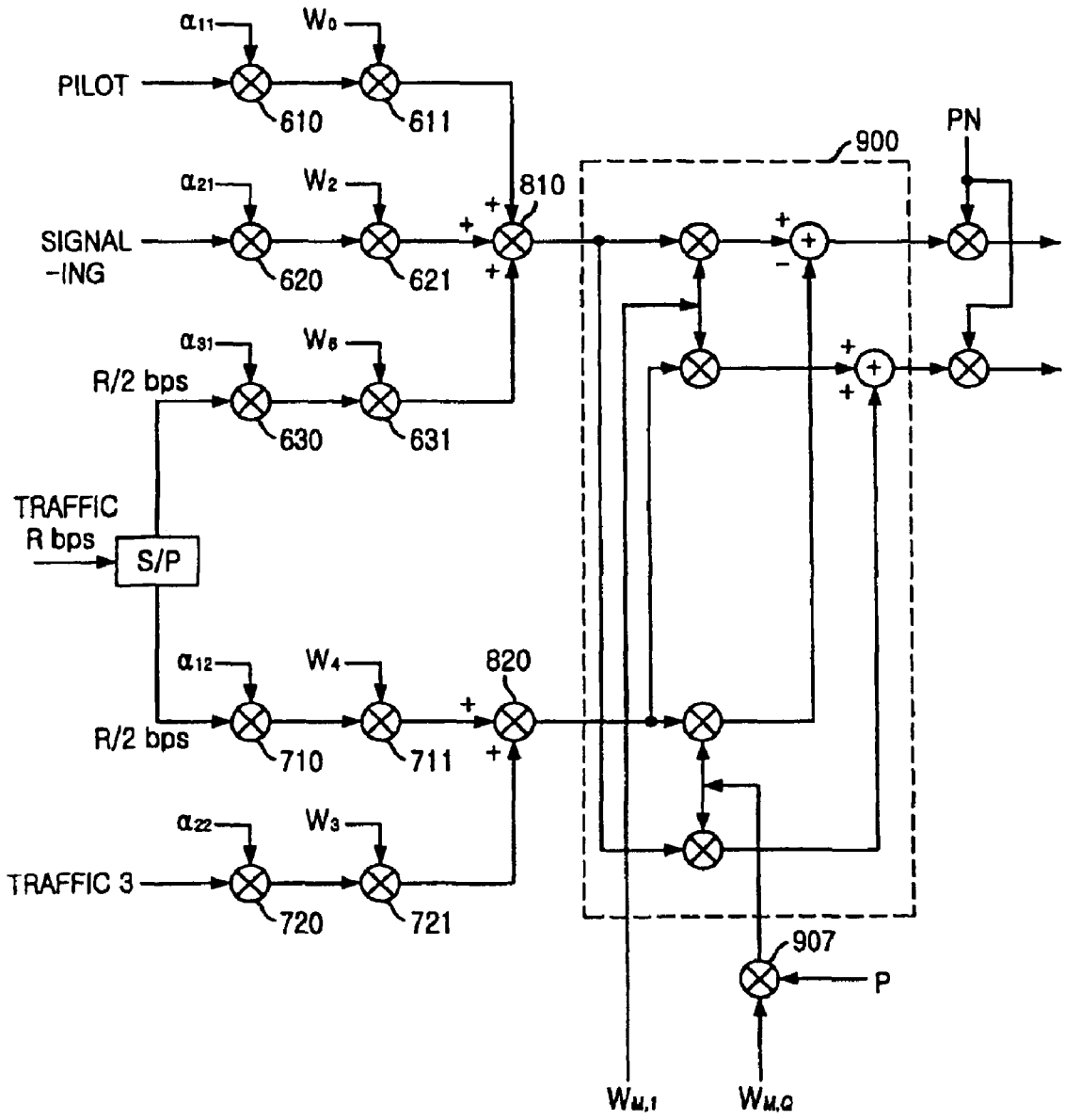
FIG. 14A is a circuit diagram illustrating a multichannel permutated orthogonal complex spreading apparatus for a multimedia service having a QPSK data according to the present invention.
Figure 14B:
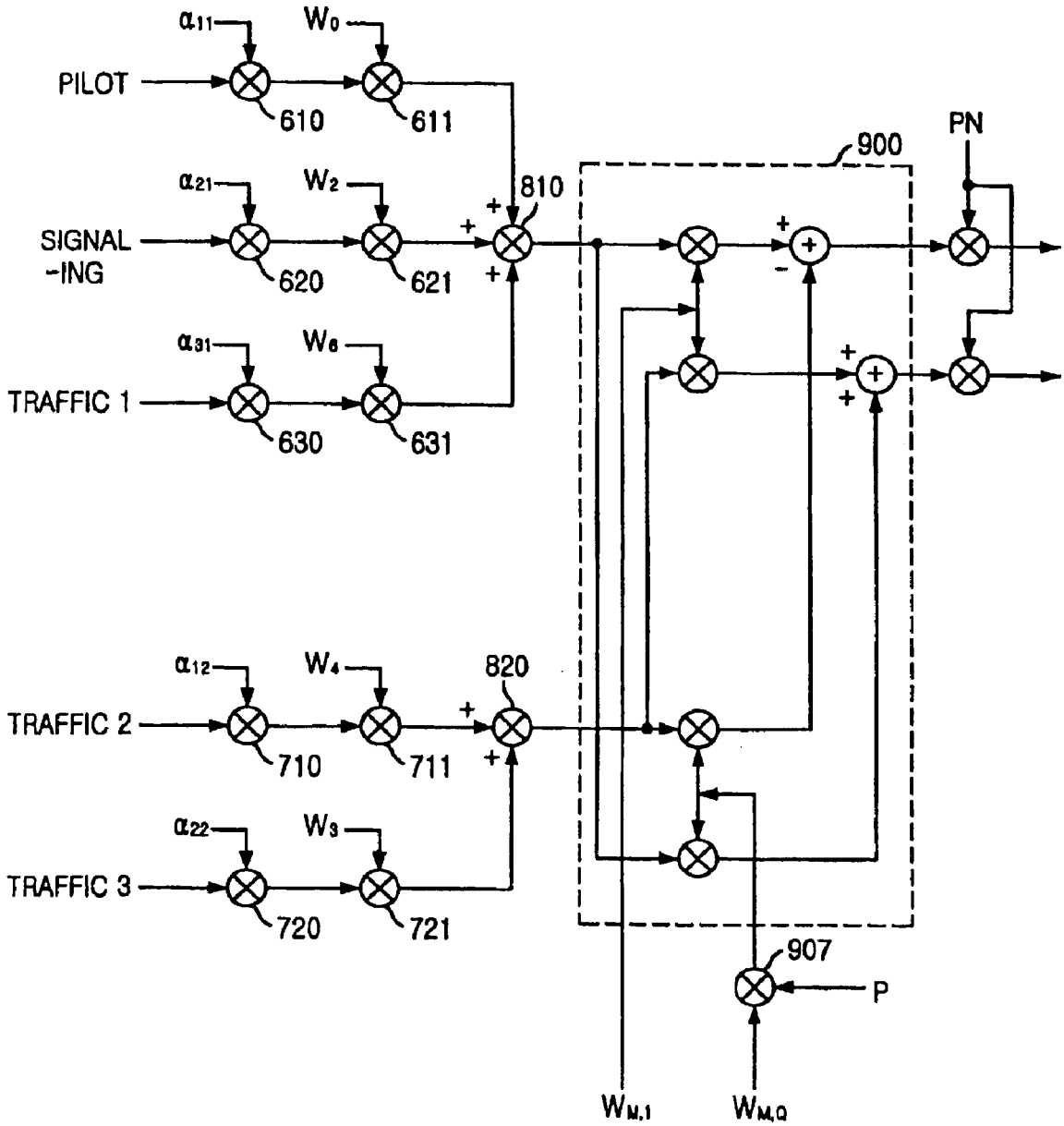
FIG. 14B is a circuit diagram illustrating a multichannel permutated orthogonal complex spreading apparatus for a multimedia service according to the present invention.

FIGS. 14A and 14B illustrate the construction of the multichannel service. In this case, the data (traffic) having a high transmission rate is converted into the QPSK data for R/2 bps through the serial to parallel converter and then is distributed to the first orthogonal Hadamard sequence multiplier 600 and the second Hadamard sequence multiplier 700, and three channels are allocated to the first orthogonal Hadamard sequence multiplier 600 and two channels are allocated to the second orthogonal Hadamard sequence multiplier 700.

As shown in FIG. 14B, the serial to parallel converter is not used, and when the data (traffic) is separated into two channel data (Traffic 1) and (traffic 2) and then is inputted, the gain adapted to each channel adapts the identical gains ($\alpha 31=\alpha 12$).

Figure 15A:
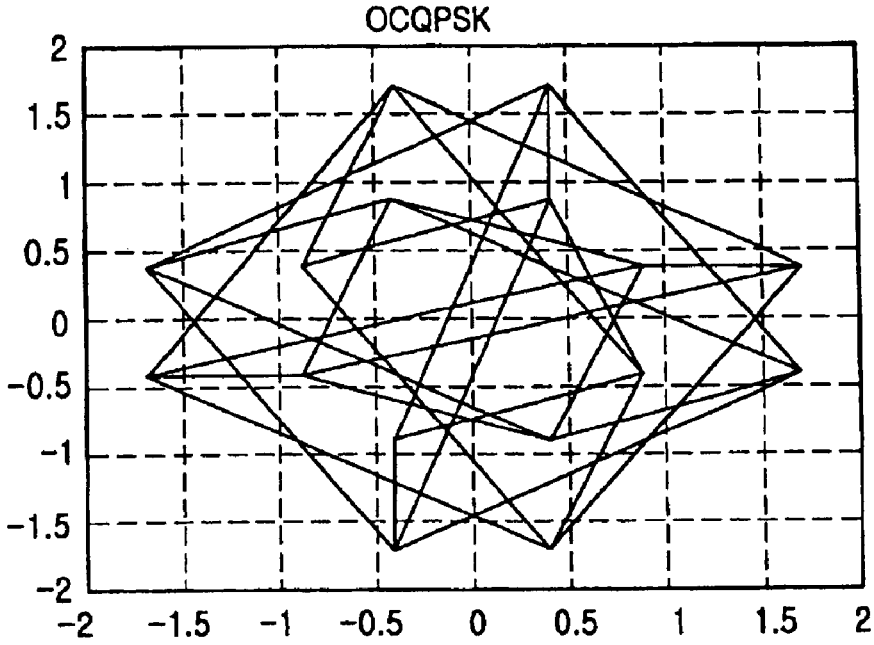
FIG. 15A is a phase trajectory view of an OCQPSK according to the present invention.
Figure 15B:
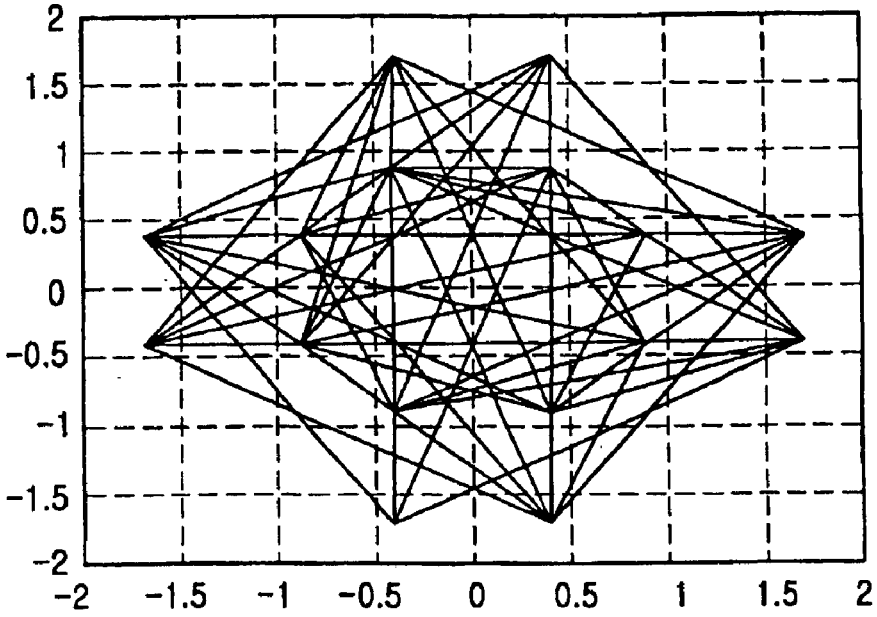
FIG. 15B is a phase trajectory view of a POCQPSK according to the present invention.
Figure 15C:
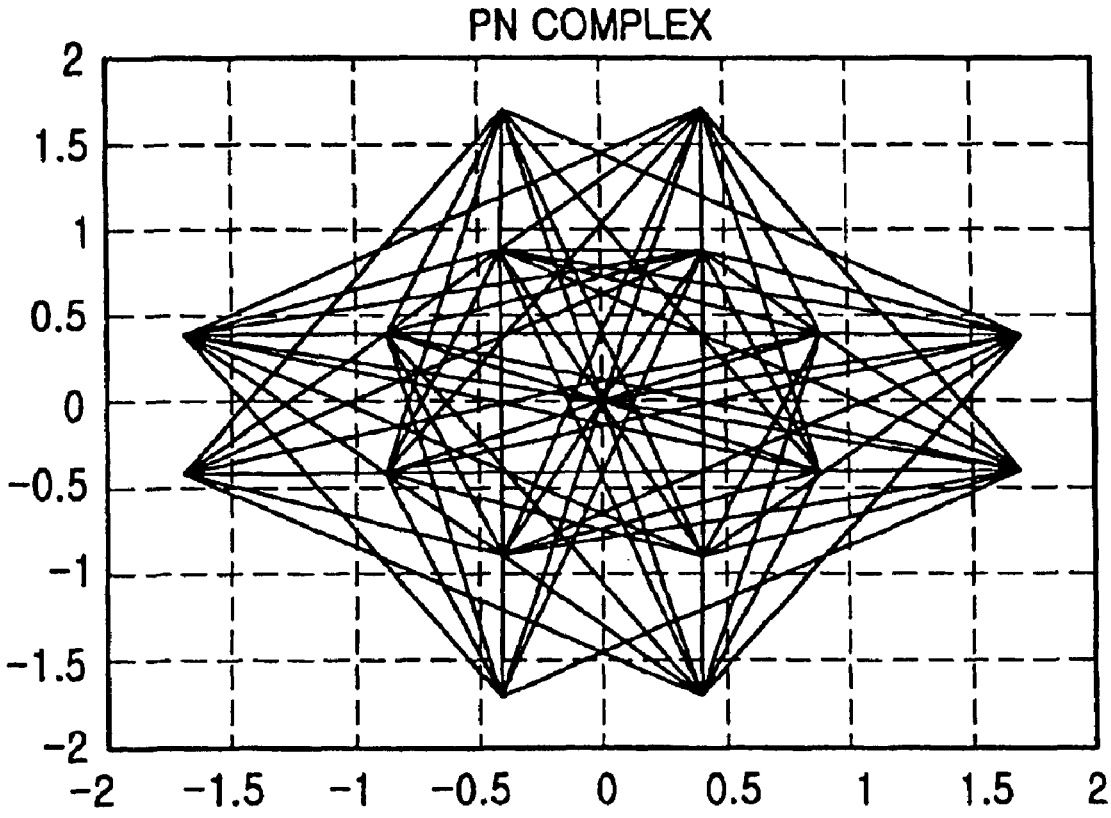
FIG. 15C is a phase trajectory view of a complex spreading method according to the present invention.

FIG. 15A is a phase trajectory view of an OCQPSK according to the present invention, FIG. 15B is a phase trajectory view of a POCQPSK according to the present invention, and FIG. 15C is a phase trajectory view of a complex spreading method according to PN complex spreading method of the present invention.

As shown therein, when comparing the embodiments of FIGS. 15A, 15B and 15C, the shapes of the trajectories and the zero points are different. In a view of the power efficiency, there is also a difference. Therefore, the statistical distribution of the peak power-to-average power ratio is different.

FIG. 7 illustrates a characteristic illustrating a statistical distribution of a peak power-to-average power ratio of the CDMA ONE method compared to the OCQPSK method and the POSQPSK.

In order to provide the identical condition, the power level of the signal channel is controlled to be the same as the power level of the communication channel, and the power level of the pilot channel is controlled to be lower than the power level of the communication channel by 4 dB, and then the statistical distribution of the peak power-to-average power ratio is compared.

In the case of the POCQPSK according to the present invention, in the first block 600 of FIG. 9, $W_{M,11}=W_0$, and $W_{M,21}=W_2$ are implemented, and in the second block 700, $W_{M,12}=W_4$, and $W_{M,I}=W_0$ and $M_{M,Q}=W_1$ are implemented. For the value of P, the spreading code is used so that consecutive two sequences have the identical value.

For example, the probability that the instantaneous power exceeds the average power value (0 dB) by 4 dB is 0.1% based on POCQPSK, and the complex spreading method is 2%. Therefore, in view of the power efficiency, the method adapting the CDMA technique according to the present invention is a new modulation method having excellent characteristic.

As described above, in the OCQPSK according to the present invention, the first data and the second data are multiplied by the gain and orthogonal code, and the resultant values are complex-summed, and the complex summed value is complex-multiplied by the complex type orthogonal code. The method that the information of the multichannel of the identical structure is summed and then spread is used. Therefore, this method statistically reduces the peak power-to-average power ratio to the desired range.

In addition, in the POCQPSK according to the present invention, the data of the first block and the data of the second block are multiplied by the gain and the orthogonal code, respectively, and the permutated orthogonal spreading code of the complex type is complex-multiplied and then spread. Therefore, this method statistically reduces the peak power-to-average power ratio to the desired range, and it is possible to decrease the phase dependency based in the multichannel interference and the multiuser interference using the combined orthogonal Hadamard sequence.

Although the preferred embodiments of the present invention have been disclosed for illustrative purposes, those skilled in the art will appreciate that various modifications, tat additions and substitutions are possible, without departing from the scope and spirit of the invention as recited in the accompanying claims.

What is claimed is:

1. An orthogonal complex spreading method for multiple channels, comprising the steps of:

complex-summing $W_{M,n1}X_{n1}$, which is obtained by multiplying an orthogonal code sequence $W_{M,n1}$ by first data group $X_{n1}$ of a n-th block, and $W_{M,n2}X_{n2}$, which is obtained by multiplying an orthogonal code sequence $W_{M,n2}$ by second data group $X_{n2}$ of a n-th block, M and n being positive integers;

complex-multiplying the complex summed form of $W_{M,n1}X_{n1}+jW_{M,n2}X_{n2}$, by a complex form of $W_{M,n3}+jW_{M,n4}$ and outputting $(W_{M,n1}X_{n1}+jW_{M,n2}X_{n2})\times(W_{M,n3}+jW_{M,n4})$ as an output signal; and summing in-phase and quadrature phase parts of the output signal outputted from a plurality of blocks as $$\left(\sum_{n=1}^{K}((W_{M,n1}X_{n1}+jW_{M,n2}X_{n2})\times(W_{M,n3}+jW_{M,n4}))\right),$$

K is a predetermined integer greater than or equal to 1 to generate I channel and Q channel signal.

2. The method of claim 1 wherein a spreading code spreads the summed in-phase and quadrature-phase signals outputted from the summing step.

3. The method of claim 1 wherein said orthogonal code sequence includes a Hadamard code sequence.

4. The method of claim 1 wherein said orthogonal code sequence includes a Walsh code.

5. The method of claim 2 wherein said spreading code is one spreading code.

6. The method of claim 5 wherein said spreading code sequence includes a PN code.

7. The method of claim 5 wherein said spreading code includes a first spreading code for the in-phase signal and a second spreading code for the quadrature-phase signal.

8. The method of claim 7 wherein the first and second spreading codes are PN codes.

9. The method of claim 3 wherein $W_{M,11}=W_0$, $W_{M,12}=W_2$, and $W_{M,13}=W_0$, $W_{M,14}=W_1$, when M=4.

10. The method of claim 9 wherein M=8 and $W_{M,12}=W_4$.

11. The method of claim 3 wherein $W_{M,n1}=W_0$, $W_{M,n2}=W_{2p}$, where p represents a predetermined number in a range from 0 to (M/2)−1, and $W_{M,n3}=W_{2n-2}$, $W_{M,n4}=W_{2n-1}$.

12. The method of claim 3 wherein $W_{M,21}=W_0$, $W_{M,22}=W_4$, $W_{M,23}=W_2$, $W_{M,24}=W_3$ when M=8 in case of two channels.

13. The method of claim 12 wherein $W_{M,12}=W_6$, and $W_{M,22}=W_6$.

14. An orthogonal complex spreading apparatus, comprising:

a plurality of complex multiplication blocks, each for complex-multiplexing a complex signal $W_{M,n1}X_{n1}+$ $jW_{M,n2}X_{n2}$ by $W_{M,n3}+jW_{M,n4}$ wherein $W_{M,n1}X_{n1}$ is obtained by multiplying an orthogonal code sequence $W_{M,n1}$ by first data group $X_{n1}$ of n-th block and $W_{M,n2}X_{n2}$ is obtained by multiplying orthogonal sequence $W_{M,n2}$ by second data group $X_{n2}$ of the n-th block, wherein M and n are positive integers and $W_{M,n1}$, $W_{M,n2}$, $W_{M,n3}$ and $W_{M,n4}$ are predetermined orthogonal sequences; and a summing unit for summing in-phase and quadrature phase parts of an output signal from each block of the plurality of the complex multiplication blocks as $$\left(\sum_{n=1}^{K}((\alpha_{n1}W_{M,n1}X_{n1}+j\alpha_{n2}W_{M,n2}X_{n2})\times(W_{M,n3}+jW_{M,n4}))\right),$$

K is a predetermined integer greater than or equal to 1.

15. The apparatus of claim 14 further comprising a spreading unit for multiplying the summed in-phase and quadrature phase signals inputted from the summing unit by spreading code.

16. The apparatus of claim 15 wherein said spreading unit multiplies the in-phase and quadrature phase part by different spreading codes.

17. The apparatus of claim 14 wherein each said complex multiplication block includes:

a first multiplier for multiplying the first data group $X_{n1}$ by the orthogonal code sequence $W_{M,n1}$;

a second multiplier for multiplying the second data group $X_{n2}$ by the orthogonal code sequence $W_{M,n2}$;

third and fourth multipliers for multiplying the output signal $W_{M,n1}X_{n1}$ from the first multiplier and the output signal $W_{M,n2}X_{n2}$ from the second multiplier by orthogonal code sequence $W_{M,n3}$;

fifth and sixth multipliers for multiplying the output signal $W_{M,n1}X_{n1}$ from the first multiplier and the output signal $W_{M,n2}X_{n2}$ from the second multiplier by orthogonal code sequence $W_{M,n4}$;

a first adder for subtracting output signal from the sixth multiplier from output signal (ac) from the third multiplier and outputting an in-phase information; and a second adder for summing output signal from the fourth multiplier and output signal from the fifth multiplier and outputting quadrature phase information.

18. The apparatus of claim 17 wherein said orthogonal code sequence includes a Hadamard code sequence.

19. The apparatus of claim 17 wherein said orthogonal code sequence includes a Walsh code.

20. A permuted orthogonal complex spreading method for multiple channels allocating at least two input channels to first and second groups, comprising the steps of:

multiplying a predetermined orthogonal code sequence $W_{M,n1}$ by first data group $X_{n1}$;

multiplying orthogonal code sequence $M_{M,n2}$ by second data group $X_{n2}$;

summing output signals $W_{M,n1}X_{n1}$ and $W_{M,n2}X_{n2}$ in the complex form of $$\sum_{n=1}^{K}(W_{M,n1}X_{n1}+jW_{M,n2}X_{n2});$$

and complex-multiplying the received output signal $$\sum_{n=1}^{K}(W_{M,n1}X_{n1}+jW_{M,n2}X_{n2})\text{ by }W_{M,I}+jPW_{M,Q}$$

wherein P is a predetermined sequence, and $W_{M,I}$ and $W_{M,Q}$ are orthogonal code sequences.

21. The method of claim 20 wherein *a spreading code spreads the output of the step of complex-multiplying, and* the spreading code is *generated based on at least* a PN code.

22. The method of claim 20 wherein P represents said predetermined sequence or predetermined spreading code or predetermined integer configured so that two consecutive sequences have identical values.

23. The method of claim 20 wherein said orthogonal code sequence includes a Hadamard code sequence.

24. The method of claim 20 wherein said orthogonal code sequence includes a Walsh code.

25. The method of claim 23 wherein $W_{M,I}=W_0$, $W_{M,Q}=W_{2q+1}$ (where q represents a predetermined number in a range from 0 to (M/2)−1).

26. The method of claim 23 further comprising the steps of:

multiplying the first data group $X_{n1}$ by gain $\alpha_{n1}$; and multiplying the second data group $X_{n2}$ by gain $\alpha_{n2}$.

27. The method of claim 23 wherein $W_{M,11}=W_0$, $W_{M,12}=W_2$, and $W_{M,I}=W_0$, $W_{M,Q}=W_1$, when M=4.

28. The method of claim 27 wherein M=8 and $W_{M,12}=W_4$.

29. The method of claim 23 wherein $W_{M,n1}=W_0$, $W_{M,n2}=W_{2q+1}$, wherein q represents a predetermined number in a range from 0 to (M/2)−1 and $W_{M,I}=W_0$, $W_{M,Q}=W_1$.

30. The method of claim 20 wherein each group has at least two channels and the receiving step includes the steps of:

summing output signals $W_{M,n1}X_{n1}$ from a first sequence multiplier; and summing output signals $W_{M,n2}X_{n2}$ from a second sequence multiplier.

31. A permuted orthogonal complex spreading apparatus for multiple channels, allocating at least two input channels to first and second groups, comprising:

a first multiplier block having at least one channel contained in a first group of channels, each for outputting $W_{M,n1}X_{n1}$ which is obtained by multiplying first data group $X_{n1}$ by orthogonal code sequence $W_{M,n1}$, and M and n are positive integers;

a second multiplier block having a number of channels having at least one channel contained in a second group of channels, each for outputting $W_{M,n2}X_{n2}$ which is obtained by multiplying a first data group $X_{n2}$ by orthogonal code sequence $W_{M,n2}$;

a complex multiplier for receiving the output signals from the first and the second multiplier blocks in a complex form of $$\sum_{n=1}^{K}(W_{M,n1}X_{n1}+jW_{M,n2}X_{n2})$$

and complex-multiplying received output signal by $W_{M,I}+jPW_{M,Q}$, wherein $W_{M,I}$ and $W_{M,Q}$ are predetermined orthogonal code sequence permuted and P is a predetermined sequence.

32. The apparatus of claim 31 wherein said orthogonal code sequence includes a Hadamard code sequence.

33. The apparatus of claim 31 wherein said orthogonal code sequence includes a Walsh code.

34. The apparatus of claim 32 wherein $W_{M,11}=W_0$, $W_{M,12}=W_4$, $W_{M,21}=W_2$, and $W_{M,I}=W_0$, $W_{M,Q}=W_1$, when M=8 in case of three input channels.

35. The apparatus of claim 32 wherein $W_{M,11}=W_0$, $W_{M,12}=W_2$, and $W_{M,I}=W_0$, $W_{M,Q}=W_1$ in case of three input channels.

36. The apparatus of claim 32 wherein $W_{M,11}=W_0$, $W_{M,12}=W_4$, $W_{M,21}=W_2$, $W_{M,31}=W_6$, and $W_{M,I}=W_0$, $W_{M,Q}=W_1$ in case of four input channels.

37. The apparatus of claim 32 wherein $W_{M,11}=W_0$, $W_{M,12}=W_4$, $W_{M,31}=W_2$, $W_{M,I}=W_0$, $W_{M,Q}=W_1$ and $W_{M,21}=W_8$ in case of four input channels.

38. The apparatus of claim 32 wherein $W_{M,11}=W_0$, $W_{M,12}=W_4$, $W_{M,21}=W_2$, $W_{M,31}=W_6$, $W_{M,22}=W_1$, and $W_{M,I}=W_0$, $W_{M,Q}=W_1$ in case of five input channels.

39. The apparatus of claim 32 wherein $W_{M,n1}=W_0$, $W_{M,12}=W_4$, $W_{M,21}=W_2$, $W_{M,31}=W_6$, $W_{M,22}=W_3$, and $W_{M,I}=W_0$, $W_{M,Q}=W_1$ in case of five input channels.

40. The apparatus of claim 31 wherein $W_{M,11}=W_0$, $W_{M,12}=W_4$, $W_{M,31}W_2$, $W_{M,22}=W_6$, and $W_{M,I}=W_0$, $W_{M,Q}=W_1$ and $W_{M,21}=W_8$ in case of five input channels.

41. The apparatus of claim 32 wherein $W_0X_{11}+jW_4X_{12}$, $W_2X_{21}$ and $W_6X_{31}$ are replaced by $\alpha_{11}W_0X_{11}+j\alpha_{12}W_4X_{12}$, $\alpha_{21}W_2X_{21}$ and $\alpha_{31}W_6X_{31}$, and a gain $\alpha_{n1}$ and a gain $\alpha_{n2}$ are the identical gain in order to remove the phase dependency by an interference occurring in a multipath of a self signal and an interference occurring by other users.

42. The apparatus of claim 31 wherein $W_{M,n1}=W_0$, $W_{M,n2}=W_2$, and $W_{M,I}=W_0$, $W_{M,Q}=W_1$.

43. The apparatus of claim 31 wherein the first multiplier block comprises at least a third multiplier for multiplying the first data group $X_{n1}$ by gain $\alpha_{n1}$, and the second multiplier block comprises at least a fourth multiplier the second data group $X_{n2}$ by gain $\alpha_{n2}$.

44. The apparatus of claim 31 wherein $W_{M,11}=W_0$, $W_{M,12}=W_{4/1}$, and $W_{M,I}=W_0$, $W_{M,Q}=W_{1/4}$, when M=8 in case of two input channels.

45. The apparatus of claim 32 wherein $W_{M,11}=W_0$, $W_{M,12}=W_{4/1}$, $W_{M,21}=W_2$, and $W_{M,I}=W_0$, $W_{M,Q}=W_{1/4}$, when M=8 in case of three input channels.

46. The method of claim 32 wherein $W_{M,11}=W_0$, $W_{M,12}=W_{2/1}$, and $W_{M,I}=W_0$, $W_{M,Q}=W_{1/2}$, when M=8 in case of two input channels.

47. The apparatus of claim 32 wherein $W_{M,11}=W_0$, $W_{M,12}=W_{2/1}$, $W_{M,21}=W_4$, and $W_{M,I}=W_0$, $W_{M,Q}=W_{1/2}$, when M=8 in case of three input channels.

48. The apparatus of claim 31 wherein each group has at least the two input channels, further comprising:

a first adder for outputting $$\sum_{n=1}^{K}(W_{M,n1}X_{n1})$$

by summing output signals from the first multiplier block; and a second adder for outputting $$\sum_{n=1}^{K}(W_{M,n2}X_{n2})$$

by summing output signals from the second multiplier block.

49. The apparatus of claim 31 further comprising:

a spreading unit for multiplying the signal $$\sum_{n=1}^{K}(W_{M,n1}X_{n1}+jW_{M,n2}X_{n2})$$

received by the complex multiplier by a spreading code.

50. The apparatus of claim 49 wherein the spreading unit respectively multiplies the in-phase and quadrature-phase parts by different spreading codes.

51. The apparatus of claim 31 wherein $W_{M,n1}$, $W_{M,n2}$, $W_{M,I}$, and $W_{M,Q}$ are orthogonal Hadamard sequences.

52. The apparatus of claim 31 wherein the complex multiplier includes:

fifth and sixth multipliers for multiplying said output signal from the first multiplier block and said output signal from the second sequence multiplier by orthogonal sequence $W_{M,I}$;

seventh and eighth multipliers for multiplying said output signal from the first multiplier block and output signal $\alpha_{n2}W_{M,n2}X_{n2}$ from the second multiplier block by orthogonal sequence $W_{M,Q}$;

a third adder for subtracting output signal from the eighth multiplier from output signal from the fifth multiplier to output an in-phase information; and a second adder for summing output signal from the sixth multiplier and output signal from the seventh multiplier to output quadrature-phase information.

53. A permuted orthogonal complex spreading apparatus for multiple channels, allocating at least two input channels into first and second groups, comprising:

first and second multiplier blocks for respectively multiplying first and second data group $X_{n1}$, and $X_{n2}$ with a set of predetermined orthogonal sequences $W_{M,n1}$, and $W_{M,n2}$ to output $W_{M,n1}X_{n1}$ and $W_{M,n2}X_{n2}$;

a complex multiplier for receiving the output signals $W_{M,n1}X_{n1}$ and $W_{M,n2}X_{n2}$ from the first and the second multiplier blocks in the complex form of $$\sum_{n=1}^{K}(W_{M,n1}X_{n1}+jW_{M,n2}X_{n2})$$

and multiplying a received signal $$\sum_{n=1}^{K}(W_{M,n1}X_{n1}+jW_{M,n2}X_{n2})$$

by a predetermined sequence $(W_{M,I}+jPW_{M,Q})\times SC$, wherein $W_{M,I}$, $W_{M,Q}$ are predetermined orthogonal sequences, P is a predetermined sequence and SC is a spreading sequence.

54. The apparatus of claim 53 wherein each group has at least two input channels, further comprising:

a first adder for outputting $$\sum_{n=1}^{K} (W_{M,n1} X_{n1})$$

by summing output signals from the first sequence multiplier; and a second adder for outputting $$\sum_{n=1}^{K} (W_{M,n2} X_{n2})$$

by summing output signals from the second sequence multiplier.

55. The apparatus of claim 53 wherein the first sequence multiplier comprises at least one first gain multiplier for multiplying the data $X_{n1}$, of each channel of the first group by gain $\alpha_{n1}$, and the second sequence multiplier comprises at least one second gain multiplier for multiplying the data $X_{n2}$ of each channel of the second group by gain $\alpha_{n2}$.

56. The apparatus of claim 53 wherein $W_{M,n1}=W_0$, $W_{M,n2}W_{2p}$, and $W_{M,I}=W_0$, $W_{M,Q}=W_1$, where p represents a predetermined integer in a range from 0 to (M/2)−1.

57. The apparatus of claim 53 wherein $W_{M,n1}$, $W_{M,n2}$, $W_{M,I}$, and $W_{M,Q}$ are orthogonal Hadamard sequences.

*58. The method of claim 20 wherein*

*the step of summing of output signals $W_{M,n1}X_{n1}$ and $W_{M,n2}X_{n2}$ includes adjusting values of the output signals $W_{M,n1}X_{n1}$ and $W_{M,n2}X_{n2}$ based on gains.*

*59. The method of claim 58 wherein*

*said step of complex-multiplying*

$$\sum_{n=1}^{K} (W_{n1} X_{n1} + j\, W_{n2} X_{n2})$$

*by $(W_{M,I}+jPW_{M,O})$ includes multiplying*

$$\sum_{n=1}^{K} (W_{n1} X_{n1} + j\, W_{n2} X_{n2})$$

*by $(W_{M,1}+jPW_{M,O})$ and by a spreading sequence, wherein $W_{M,I}=W_0$ and $W_{M,O}=W_1$.*

*60. The method of claim 59 wherein,*

*P comprises a sequence, said sequence including pairs of consecutive sequence elements, respective sequence elements of any one of the pairs having a same value.*

*61. The apparatus of claim 53 wherein*

*the first multiplier block is configured to adjust the values of $W_{M,n1}X_{n1}$ based on first relative gains, and*

*the second multiplier block is configured to adjust the values of $W_{M,n2}X_{n2}$ based on second relative gains.*

*62. The apparatus of claim 53 wherein*

*$W_{M,n1}$ and $W_{M,n2}$ comprise gain adjusted sequence elements.*

*63. The method of claim 20, wherein*

*$W_{M,1}=W_0$ and $W_{M,O}=W_1$.*

*64. The method of claim 63, further comprising:*

*adjusting the values of $W_{M,n1}X_{n1}$ based on first relative gains, and*

*adjusting the values of $W_{M,n2}X_{n2}$ based on second relative gains.*

*65. The method of claim 63, wherein*

*$W_{M,n1}$ and $W_{M,n2}$ comprise gain adjusted sequence elements.*

*66. The method of claim 63, wherein*

*P is generated based on a spreading sequence.*

*67. The method of claim 63, wherein*

*the spreading sequence is generated based on a PN code.*

*68. The apparatus of claim 53, wherein*

*$W_{M,1}=W_0$ and $W_{M,O}=W_1$.*

*69. The method of claim 68, wherein*

*P is generated based on a spreading sequence.*

*70. The method of claim 69, wherein*

*the spreading sequence is generated based on a PN code.*

*71. A spreading method, comprising:*

*generating*

$$\sum_{n=1}^{K} (\alpha_{n1} OS_{n1} X_{n1})$$

*based on at least one or more first input signals $X_{11}, \ldots, X_{K1}$, one or more first orthogonal code sequences $OS_{11}, \ldots, OS_{K1}$, and one or more first gains $\alpha_{11}, \ldots, \alpha_{K1}$, K being a positive integer;*

*generating*

$$\sum_{n=1}^{L} (\alpha_{n2} OS_{n2} X_{n2})$$

*based on at least one or more second input signals $X_{12}, \ldots, X_{L2}$, one or more second orthogonal code sequences $OS_{12}, \ldots, OS_{L2}$, and one or more second gains $\alpha_{12}, \ldots, \alpha_{L2}$, L being a positive integer; and*

*complex-multiplying*

$$\sum_{n=1}^{K} (\alpha_{n1} OS_{n1} X_{n1}) + j \sum_{n=1}^{L} (\alpha_{n2} OS_{n2} X_{n2})$$

*by $(W_0+jP\cdot W_1)\times SC$,*

*wherein P is a third sequence and SC is a first sequence comprising at least a first element having a first value and a second element having a second value.*

*72. The method of claim 71 wherein,*

*P comprises a second sequence, said second sequence including pairs of consecutive sequence elements, respective sequence elements of any one of the pairs having a same value.*

*73. The method of claim 71, wherein the first sequence is generated based on at least a PN code.*

*74. The method of claim 73 wherein,*

*P comprises a second sequence, said second sequence including pairs of consecutive sequence elements, respective sequence elements of any one of the pairs having a same value.*

*75. The method of claim 71, wherein at least one of the one or more first orthogonal code sequences consists of a plurality of ones.*

*76. The method of claim 75, wherein SC is a PN code and at least one of the one or more first gains has a value of 1.*

*77. A spreading apparatus comprising:*

*first multiplier mechanism for generating*

$$\sum_{n=1}^{K}(\alpha_{n1}OS_{n1}X_{n1})$$

*based on at least one or more first input signals* $X_{11}, \ldots, X_{K1}$, *one or more first orthogonal code sequences* $OS_{11}, \ldots, OS_{K1}$, *and one or more first gains* $\alpha_{11}, \ldots, \alpha_{K1}$, *K being a positive integer;*

*second multiplier mechanism for generating*

$$\sum_{n=1}^{L}(\alpha_{n2}OS_{n2}X_{n2})$$

*based on one or more second input signals* $X_{12}, \ldots, X_{L2}$, *one or more second orthogonal code sequences* $OS_{12}, \ldots, OS_{L2}$, *and one or more second gains* $\alpha_{12}, \ldots, \alpha_{L2}$, *L being a positive integer;*

*a complex multiplier for multiplying*

$$\sum_{n=1}^{K}(\alpha_{n1}OS_{n1}X_{n1}) + j\sum_{n=1}^{L}(\alpha_{n2}OS_{n2}X_{n2})$$

*by* $(W_0+jP\cdot W_1)\times SC$, *wherein P is a third sequence and SC is a first sequence comprising at least a first element having a first value and a second element having a second value.*

*78. The apparatus of claim 77 wherein,*

*P comprises a second sequence, said second sequence including pairs of consecutive sequence elements, respective sequence elements of any one of the pairs having a same value.*

*79. The apparatus of claim 77, wherein the first sequence is generated based on at least a PN code.*

*80. The apparatus of claim 79 wherein,*

*P comprises a second sequence, said sequence including pairs of consecutive sequence elements, respective sequence elements of any one of the pairs having a same value.*

*81. The apparatus of claim 77, wherein at least one of the one or more first orthogonal code sequences consists of a plurality of ones.*

*82. The apparatus of claim 81, wherein SC is a PN code.*

*83. The apparatus of claim 81, wherein at least one of the one or more first gains has a value of 1.*

*84. A spreading apparatus, comprising:*

*a first multiplier mechanism configured to generate*

$$\sum_{n=1}^{K}(\alpha_{n1}OS_{n1}X_{n1})$$

*based on at least one or more first input signals* $X_{11}, \ldots, X_{K1}$, *one or more first orthogonal code sequences* $OS_{11}, \ldots, OS_{K1}$, *and one or more first gains* $\alpha_{11}, \ldots, \alpha_{K1}$, *K being a positive integer;*

*a second multiplier mechanism configured to generate*

$$\sum_{n=1}^{L}(\alpha_{n2}OS_{n2}X_{n2})$$

*based on at least one or more second input signals* $X_{12}, \ldots, X_{L2}$, *one or more second orthogonal code sequences* $OS_{12}, \ldots, OS_{L2}$, *and one or more second gains* $\alpha_{12}, \ldots, \alpha_{L2}$, *L being a positive integer; and*

*a complex multiplier configured to multiply*

$$\sum_{n=1}^{K}(\alpha_{n1}OS_{n1}X_{n1}) + j\sum_{n=1}^{L}(\alpha_{n2}OS_{n2}X_{n2})$$

*by* $(W_0+jP\cdot W_1)\times SC$, *wherein P is a third sequence and SC is a spreading sequence.*

*85. The apparatus of claim 84 wherein,*

*P comprises a sequence, said sequence including pairs of consecutive sequence elements, respective sequence elements of any one of the pairs having a same value.*

*86. The apparatus of claim 84, wherein SC is generated based on at least a PN code.*

*87. The apparatus of claim 86 wherein,*

*P comprises a sequence, said sequence including pairs of consecutive sequence elements, respective sequence elements of any one of the pairs having a same value.*

*88. The apparatus of claim 84, wherein at least one of the one or more first orthogonal code sequences consists of a plurality of ones.*

*89. The apparatus of claim 88, wherein at least one of the one or more first gains has a value of 1.*

*90. A spreading method, comprising:*

*generating a first signal, a, based on at least a first input, a first code, and a first gain;*

*generating a second signal, b, based on at least a second input, a second code, and a second gain;*

*generating a third signal, d, based on at least a first sequence of sequence elements, the sequence elements in the first sequence systematically alternating between a first value and a second value, the first value being different from the second value;*

*systematically generating* $SC\cdot a-SC\cdot b\cdot d$; *and*

*systematically generating* $SC\cdot b+SC\cdot a\cdot d$, *wherein*

*SC is a first PN code.*

*91. The method of claim 90, wherein the first sequence of sequence elements is* $W_1$.

*92. The method of claim 90, wherein d is generated based on at least the first sequence and a second sequence.*

*93. The method of claim 92, wherein the second sequence is generated based on a second PN code.*

*94. The method of claim 92 wherein the second sequence is generated based on a spreading sequence.*

*95. The method of claim 92 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*96. The method of claim 92 wherein d is generated by multiplying the first sequence and the second sequence.*

*97. The method of claim 90, wherein the first value is 1 and the second value is −1.*

*98. The method of claim 92, wherein the second sequence consists of a sequence of groups, wherein each of the groups consists of either two elements both having the first value or two elements both having the second value.*

*99. The method of claim 98, wherein the second sequence is generated based on a second PN code.*

*100. The method of claim 90, wherein the first orthogonal code and the second orthogonal code include Walsh codes.*

*101. The method of claim 90 wherein the first code and the second code are even-numbered Walsh codes.*

*102. A spreading method, comprising:*

*generating a first signal, a, based on at least a first input, a first Walsh code, and a first gain;*

*generating a second signal, b, based on at least a second input, a second Walsh code, and a second gain;*

*receiving a first sequence, SC, comprising a first element having a first value and a second element having a second value, the first value being different from the second value;*

*generating a third signal, d, based on at least a third Walsh code, the third Walsh code being a second sequence of sequence elements and the sequence elements in the second sequence systematically alternating between the first value and the second value;*

*systematically generating SC·a−SC·b·d; and*

*systematically generating SC·b+SC·a·d.*

*103. The method of claim 102, wherein the third Walsh code is* $W_1$.

*104. The method of claim 102, wherein d is generated based on at least the third Walsh code and a third sequence.*

*105. The method of claim 104, wherein the third sequence consists of a sequence of groups, wherein each of the groups consists of either two elements both having the first value or two elements both having the second value.*

*106. The method of claim 105, wherein SC is a first PN code.*

*107. The method of claim 106, wherein the third sequence is generated based on a second PN code.*

*108. The method of claim 104 wherein the third sequence is generated based on a spreading sequence.*

*109. The method of claim 104 wherein the third sequence consists of elements, one or more of the elements having the first value and the remaining elements having the second value, wherein for each (2N−1)th element, the value of the (2N−1)th element is the same as the value of a (2N)th element, where N is a positive integer.*

*110. The method of claim 104 wherein d is generated by multiplying the third sequence and the third Walsh code.*

*111. The method of claim 104, wherein SC is a first PN code.*

*112. The method of claim 111, wherein the third sequence is generated based on a second PN code.*

*113. The method of claim 102, wherein the first value is 1 and the second value is −1.*

*114. The method of claim 102, wherein SC is generated based on at least a PN code.*

*115. The method of claim 102 wherein the first sequence is a spreading sequence.*

*116. The method of claim 102 wherein the first and the second Walsh codes are even-numbered Walsh codes.*

*117. The method of claim 102, wherein SC is a first PN code.*

*118. An apparatus for wireless communications, comprising:*

*a first multiplier mechanism configured to generate a first signal, a, the first multiplier mechanism having at least a first set of multipliers and a first adder;*

*a second multiplier mechanism configured to generate a second signal, b, the second multiplier mechanism having at least a second set of multipliers and a second adder;*

*an input generator configured to generate an input, d, based on at least a first sequence of sequence elements, the sequence elements in the first sequence systematically alternating between a first value and a second value, the first value being different from the second value;*

*a third multiplier mechanism configured to receive at least the first signal, a, the second signal, b, a second sequence, SC, and the input, d, and to systematically generate SC·a−SC·b·d and SC·b+SC·a·d, the third multiplier mechanism having at least a third set of multipliers and a set of adders, wherein the second sequence comprises at least a first element having the first value and a second element having the second value.*

*119. The apparatus of claim 118, wherein the first sequence of sequence elements is* $W_1$.

*120. The apparatus of claim 118, wherein d is generated based on at least the first sequence and a third sequence.*

*121. The apparatus of claim 120, wherein the third sequence consists of a sequence of groups, wherein each of the groups consists of either two elements both having the first value or two elements both having the second value.*

*122. The apparatus of claim 121, wherein SC is a first PN code.*

*123. The apparatus of claim 122, wherein the third sequence is generated based on a second PN code.*

*124. The apparatus of claim 120 wherein the third sequence is generated based on a spreading sequence.*

*125. The apparatus of claim 118 wherein the third sequence consists of elements, one or more of the elements having the first value and the remaining elements having the second value, wherein for each (2N−1)th element, the value of the (2N−1)th element is the same as the value of a (2N)th element, where N is a positive integer.*

*126. The method of claim 120 wherein d is generated by multiplying the third sequence and the first sequence.*

*127. The apparatus of claim 120, wherein SC is a first PN code.*

*128. The apparatus of claim 127, wherein the third sequence is generated based on a second PN code.*

*129. The apparatus of claim 118, wherein the first value is 1 and the second value is −1.*

*130. The apparatus of claim 118 wherein the second sequence is a spreading sequence.*

*131. The apparatus of claim 118 wherein the first signal and the second signal are generated based on at least even numbered Walsh codes.*

*132. The apparatus of claim 118 wherein the second sequence is generated based on at least a PN code.*

*133. The apparatus of claim 118, wherein SC is a first PN code.*

*134. A system for wireless communications, comprising:*

*a sequence mechanism configured to provide a first sequence, SC, the first sequence comprising at least a first element having a first value and a second element having a second value;*

*a first input generator configured to generate at least a first input, a, and a second input, b;*

*a second input generator configured to generate at least a third input, d, based on at least a second sequence of sequence elements, the sequence elements in the second sequence systematically alternating between the first value and the second value;*

*a multiplier mechanism configured to receive at least a, b, SC, and d and to systematically generate SC·a−SC·b·d and SC·b+SC·a·d.*

*135. The system of claim 134, wherein the second sequence of sequence elements is* $W_1$.

*136. The system of claim 134, wherein d is generated based on at least the second sequence and a third sequence.*

*137. The system of claim 136, wherein the third sequence consists of a sequence of groups, wherein each of the groups consists of either two elements both having the first value or two elements both having the second value.*

*138. The system of claim 137 wherein the first signal and the second signal are generated based on at least even numbered Walsh codes.*

*139. The system of claim 137, wherein SC is a first PN code.*

*140. The system of claim 139, wherein the third sequence is generated based on a second PN code.*

*141. The system of claim 136 wherein the third sequence is generated based on a spreading sequence.*

*142. The system of claim 136 wherein the third sequence consists of elements, one or more of the elements having the first value and the remaining elements having the second value, wherein for each (2N−1)th element, the value of the (2N−1)th element is the same as the value of a (2N)th element, where N is a positive integer.*

*143. The system of claim 136 wherein d is generated by multiplying the third sequence and the second sequence.*

*144. The system of claim 136, wherein SC is a first PN code.*

*145. The system of claim 144, wherein the third sequence is generated based on a second PN code.*

*146. The system of claim 134, wherein the first value is 1 and the second value is −1.*

*147. The system of claim 134 wherein the first sequence is a spreading sequence.*

*148. The system of claim 134 wherein the first sequence is generated based on at least a PN code.*

*149. The system of claim 134, wherein SC is a first PN code.*

*150. An apparatus for wireless communications, comprising:*

*means for generating a first signal, a, based on at least a first input signal, a first code, and a first relative gain;*

*means for generating a second signal, b, based on at least a second input signal, a second code, and a second relative gain;*

*a sequence mechanism configured to provide a first sequence, SC, the first sequence comprising at least a first element having a first value and a second element having a second value;*

*an input generator configured to generate an input, d, based on at least a second sequence of sequence elements, the sequence elements in the second sequence systematically alternating between the first value and the second value; and*

*means for receiving at least the first signal, a, the second signal, b, the first sequence, SC, and the input, d, and for systematically generating SC·a−SC·b·d and SC·b+SC·a·d.*

*151. The apparatus of claim 150, wherein the second sequence is $W_1$.*

*152. The apparatus of claim 150, wherein d is generated based on at least the second sequence and a third sequence.*

*153. The apparatus of claim 152, wherein the third sequence consists of a sequence of groups, wherein each of the groups consists of either two elements both having the first value or two elements both having the second value.*

*154. The apparatus of claim 153, whrein SC is a first PN code.*

*155. The apparatus of claim 154, wherein the third sequence is generated based on a second PN code.*

*156. The apparatus of claim 152 wherein the third sequence is generated based on a spreading sequence.*

*157. The apparatus of claim 152 wherein the third sequence consists of elements, one or more of the elements having the first value and the remaining elements having the second value, wherein for each (2N−1)th element, the value of the (2N−1)th element is the same as the value of a (2N)th element, where N is a positive integer.*

*158. The apparatus of claim 153 wherein the first signal and the second signal are generated based on at least even numbered Walsh codes.*

*159. The apparatus of claim 152, whrein SC is a first PN code.*

*160. The apparatus of claim 159, wherein the third sequence is generated based on a second PN code.*

*161. The apparatus of claim 150, wherein the first value is 1 and the second value is −1.*

*162. The apparatus of claim 150, wherein*

*the first orthogonal code and the second orthogonal code are even numbered Walsh codes.*

*163. The apparatus of claim 150, wherein SC is generated based on at least a PN code.*

*164. The apparatus of claim 150 wherein the first sequence is a spreading sequence.*

*165. The apparatus of claim 150, wherein SC is a first PN code.*

*166. A spreading method comprising:*

*receiving a complex input signal comprising in-phase data and quadrature-phase data;*

*receiving a first sequence of sequence elements, the sequence elements in the first sequence systematically alternating between a first value and a second value;*

*receiving a complex code comprising an in-phase component and a quadrature-phase component, the quadrature-phase component systematically comprising the in-phase component multiplied by at least the first sequence of sequence elements; and*

*complex multiplying the complex input signal by the complex code.*

*167. The method of claim 166, wherein the in-phase component only comprises a spreading sequence.*

*168. The method of claim 167, wherein the spreading sequence is generated based on at least a PN code.*

*169. The method of claim 167, wherein the spreading sequence is a first PN code.*

*170. The method of claim 166, wherein the quadrature-phase component comprises the in-phase component multiplied by at least the first sequence of sequence elements and a second sequence.*

*171. The method of claim 170, wherein the second sequence consists of a sequence of groups, wherein each of the groups consists of either two elements both having the first value or two elements both having the second value.*

*172. The method of claim 171, wherein the second sequence is generated based on a second PN code.*

*173. The method of claim 170 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*174. The method of claim 170, wherein the second sequence is generated based on a second PN code.*

*175. The method of claim 166, wherein the first value is 1 and the second value is −1.*

*176. The method of claim 166 wherein the first sequence of sequence elements is $W_1$.*

*177. A spreading unit comprising:*

*a first input unit configured to receive a complex input signal comprising in-phase data and quadrature-phase data;*

*a second input unit configured to receive a first sequence of sequence elements, the sequence elements in the first sequence systematically alternating between a first value and a second value;*

*a third input unit configured to receive a complex code comprising an in-phase component and a quadrature-phase component, the quadrature-phase component systematically comprising the in-phase component multiplied by at least the first sequence of sequence elements; and*

*a complex multiplier configured to complex multiply the complex input signal by a complex code.*

*178. The unit of claim 177, wherein the in-phase component only comprises a spreading sequence.*

*179. The unit of claim 178, wherein the spreading sequence is generated based on at least a PN code.*

*180. The unit of claim 179 wherein the first sequence of sequence elements is* $W_1$.

*181. The unit of claim 178, wherein the spreading sequence is a PN code.*

*182. The unit of claim 177, wherein the quadrature-phase component comprises the in-phase component multiplied by at least the first sequence of sequence elements and a second sequence, wherein the second sequence is generated based on a PN code.*

*183. The unit of claim 182, wherein the second sequence consists of a sequence of groups, wherein each of the groups consists of either two elements both having the first value or two elements both having the second value.*

*184. The unit of claim 182 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*185. The unit of claim 177, wherein the first value is 1 and the second value is −1.*

*186. The unit of claim 177 wherein the first sequence of sequence elements is* $W_1$.

*187. A spreading unit comprising:*

*a first input unit configured to receive a complex input signal comprising in-phase data and quadrature-phase data,*

*a second input unit configured to receive a first sequence of sequence elements, the sequence elements in the first sequence systematically alternating between a first value and a second value;*

*a third input unit configured to receive a complex code comprising an in-phase component and a quadrature-phase component, the quadrature-phase component systematically comprising the in-phase component multiplied by at least the first sequence of sequence elements; and*

*means for complex multiplying the complex input signal by the complex code.*

*188. The unit of claim 187, wherein the in-phase component only comprises a spreading sequence.*

*189. The unit of claim 188, wherein the spreading sequence is a first PN code.*

*190. The unit of claim 188, wherein the spreading sequence is generated based on at least a PN code.*

*191. The unit of claim 187, wherein the quadrature-phase component comprises the in-phase component multiplied by at least the first sequence of sequence elements and a second sequence.*

*192. The unit of claim 191 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*193. The unit of claim 191, wherein the second sequence is generated based on a second PN code.*

*194. The unit of claim 187, wherein the first value is 1 and the second value is −1.*

*195. The unit of claim 194, wherein the second sequence consists of a sequence of groups, wherein each of the groups consists of either two elements both having the first value or two elements both having the second value.*

*196. The unit of claim 195, wherein the second sequence is generated based on a second PN code.*

*197. A spreading method comprising:*

*generating a complex signal comprising an in-phase data signal and a quadrature-phase data signal;*

*receiving a first sequence of sequence elements, each (2N−1)th sequence element in the first sequence having a first value and each (2N)th sequence element in the first sequence having a second value, N being a positive integer;*

*receiving a complex code comprising an in-phase component and a quadrature-phase component, the quadrature-phase component systematically comprises the in-phase component multiplied by the first sequence of sequence elements; and*

*complex multiplying the complex signal by the complex code.*

*198. The method of claim 197, wherein the in-phase component comprises only a spreading sequence.*

*199. The method of claim 198, wherein the spreading sequence is generated based on at least a PN code.*

*200. The method of claim 198, wherein the spreading sequence is a first PN code.*

*201. The method of claim 197, wherein the first value is 1 and the second value is −1.*

*202. The method of claim 197, wherein the quadrature-phase component comprises the in-phase component multiplied by at least the first sequence of sequence elements and a second sequence.*

*203. The method of claim 202, wherein the second sequence consists of a sequence of groups, wherein each of the groups consists of either two elements both having the first value or two elements both having the second value.*

*204. The method of claim 203, wherein the second sequence is generated based on a second PN code.*

*205. The method of claim 202 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*206. The method of claim 202, wherein the second sequence is generated based on a second PN code.*

*207. The method of claim 197 wherein the first sequence of sequence elements is* $W_1$.

*208. A spreading unit comprising:*

*an output unit configured to generate a complex signal comprising an in-phase data signal and a quadrature-phase data signal, the output unit including a first adder configured to add one or more first signals to generate the in-phase data signal and a second adder configured to add one or more second signals to generate the quadrature-phase data signal;*

*a first input unit configured to receive a first sequence of sequence elements, each (2N−1)th sequence element in*

*the first sequence systematically having a first value and each (2N)th sequence element in the first sequence systematically having a second value, wherein N is a positive integer;*

*a second input unit configured to receive a complex code comprising an in-phase component and a quadrature-phase component, quadrature-phase component systematically comprising the in-phase component multiplied by at least the first sequence of sequence elements; and*

*a complex multiplier configured to multiply the complex signal by the complex code.*

*209. The unit of claim 208, wherein the in-phase component comprises only a spreading sequence.*

*210. The unit of claim 209, wherein the spreading sequence is generated based on at least a PN code.*

*211. The unit of claim 209, wherein the spreading sequence is a first PN code.*

*212. The unit of claim 208, wherein the first value is 1 and the second value is −1.*

*213. The unit of claim 208, wherein the quadrature-phase component comprises the in-phase component multiplied by at least the first sequence of sequence elements and a second sequence.*

*214. The unit of claim 213, wherein the second sequence consists of a sequence of groups, wherein each of the groups consists of either two elements both having the first value or two elements both having the second value.*

*215. The unit of claim 214, wherein the second sequence is generated based on a second PN code.*

*216. The unit of claim 213 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*217. The unit of claim 213, wherein the second sequence is generated based on a second PN code.*

*218. The unit of claim 208 wherein the first sequence of sequence elements is $W_1$.*

*219. A spreading unit comprising:*

*means for generating a complex data signal comprising an in-phase data signal and a quadrature-phase data signal;*

*an input unit configured to receive a first sequence of sequence elements, each (2N−1)th sequence element in the first sequence systematically having a first value and each (2N)th sequence element in the first sequence systematically having a second value, wherein N is a positive integer;*

*means for receiving a complex code comprising an in-phase component and a quadrature-phase component, the quadrature-phase component systematically comprising the in-phase component multiplied by at least the first sequence of sequence elements; and*

*means for complex multiplying the complex data signal by the complex code.*

*220. The unit of claim 219, wherein the in-phase component comprises only a spreading sequence.*

*221. The unit of claim 220, wherein the spreading sequence is generated based on at least a PN code.*

*222. The unit of claim 220, wherein the spreading sequence is a first PN code.*

*223. The unit of claim 219, wherein the first value is 1 and the second value is −1.*

*224. The unit of claim 219, wherein the quadrature-phase component comprises the in-phase component multiplied by at least the first sequence of sequence elements and a second sequence.*

*225. The unit of claim 224, wherein the second sequence consists of a sequence of groups, wherein each of the groups consists of either two elements both having the first value or two elements both having the second value.*

*226. The method of claim 265, wherein each (2N−1)th sequence element in the second sequence has a first value and each (2N)th sequence element in the second sequence has a second value, wherein N is a positive integer.*

*227. The unit of claim 224 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*228. The unit of claim 224, wherein the second sequence is generated based on a second PN code.*

*229. The unit of claim 219 wherein the first sequence of sequence elements is $W_1$.*

*230. A spreading method, comprising:*

*receiving a complex input signal comprising in-phase data and quadrature-phase data;*

*receiving a first sequence of sequence elements, each (2N−1)th sequence element in the first sequence systematically having a first value and each (2N)th sequence element in the first sequence systematically having a second value, N being a positive integer;*

*receiving a complex sequence comprising an in-phase component and a quadrature-phase component, the quadrature-phase component systematically comprising the in-phase component multiplied by the first sequence of sequence elements; and*

*complex multiplying the complex input signal by the complex sequence.*

*231. The method of claim 230, wherein the first sequence of sequence elements is $W_1$.*

*232. The method of claim 230, wherein the quadrature-phase component comprises the in-phase component multiplied by at least the first sequence of sequence elements and a second sequence.*

*233. The method of claim 232, wherein,*

*the second sequence consists of a sequence of groups, wherein each of the groups consists of either two elements both having the first value or two elements both having the second value.*

*234. The method of claim 233, wherein the second sequence is generated based on a PN code.*

*235. The method of claim 232, wherein the second sequence is generated based on a PN code.*

*236. The method of claim 232 wherein the second sequence consists of elements, one or more of the elements having the first value and the remaining elements having the second value, wherein for each (2N−1)th element, the value of the (2N−1)th element is the same as the value of a (2N)th element, where N is a positive integer.*

*237. The method of claim 236, wherein the second sequence is generated based on a PN code.*

*238. The method of claim 230 wherein the first value is 1 and the second value is −1.*

*239. The method of claim 230, wherein the in-phase component comprises a spreading sequence.*

*240. The method of claim 239, wherein the spreading sequence is generated based on at least a PN code.*

*241. The method of claim 239, wherein the spreading sequence is a PN code.*

*242. A spreading apparatus comprising:*

*a first input unit configured to receive a complex input signal comprising in-phase data and quadrature-phase data;*

*a second input unit configured to receive a first sequence of sequence elements, each (2N−1)th sequence element in the first sequence symmetrically having a first value and each (2N)th sequence element in the first sequence systematically having a second value, wherein N is a positive integer and the first value is different from the second value;*

*a third input unit configured to receive a complex sequence comprising an in-phase component and a quadrature-phase component, the quadrature-phase component systematically comprising the in-phase component multiplied by at least the first sequence of sequence elements; and*

*a complex multiplier for complex multiplying the complex input signal by the complex sequence.*

*243. The apparatus of claim 242, wherein the first sequence of sequence elements is* $W_1$.

*244. The apparatus of claim 242, wherein the quadrature-phase component comprises the in-phase component multiplied by at least the first sequence of sequence elements and a second sequence.*

*245. The apparatus of claim 244, wherein the second sequence consists of a sequence of groups, wherein each of the groups consists of either two elements both having the first value or two elements both having the second value.*

*246. The apparatus of claim 245, wherein the second sequence is generated based on a PN code.*

*247. The apparatus of claim 244, wherein, the second sequence consists of elements, one or more of the elements having the first value and the remaining elements having the second value, wherein for each (2N−1)th element, the value of the (2N−1)th element is the same as the value of a (2N)th element, where N is a positive integer.*

*248. The apparatus of claim 247, wherein the second sequence is generated based on a PN code.*

*249. The apparatus of claim 242 wherein the first value is 1 and the second value is −1.*

*250. The apparatus of claim 242, wherein the in-phase component comprises a spreading sequence.*

*251. The apparatus of claim 250, wherein the spreading sequence is generated based on at least a PN code.*

*252. The apparatus of claim 250, wherein the spreading sequence is a PN code.*

*253. The apparatus of claim 264, wherein the first sequence of sequence elements is* $W_1$.

*254. The apparatus of claim 264, wherein the quadrature-phase component comprises the in-phase component multiplied by at least the first sequence of sequence elements and a second sequence.*

*255. The apparatus of claim 254, wherein the second sequence is generated based on a PN code.*

*256. The apparatus of claim 254, wherein the second sequence consists of a sequence of groups, wherein each of the groups consists of either two elements both having the first value or two elements both having the second value.*

*257. The apparatus of claim 256, wherein the second sequence is generated based on a PN code.*

*258. The apparatus of claim 254, wherein, the second sequence comprises a sequence consisting of sequence elements, one or more of the sequence elements having the first value and the remaining sequence elements having the second value, wherein for each (2N−1)th sequence element, the value of the (2N−1)th sequence element is the same value of a (2N)th sequence element, where N is a positive integer.*

*259. The apparatus of claim 258, wherein the second sequence is generated based on a PN code.*

*260. The apparatus of claim 264 wherein the first value is 1 and the second value is −1.*

*261. The apparatus of claim 264, wherein the in-phase component comprises a spreading sequence.*

*262. The apparatus of claim 261, wherein the spreading sequence is generated based on at least a PN code.*

*263. The apparatus of claim 261, wherein the spreading sequence is a PN code.*

*264. A spreading apparatus comprising:*

*a first input unit configured to receive a complex input signal comprising in-phase data and quadrature-phase data;*

*a second input unit configured to receive a first sequence of sequence elements, with each (2N−1)th sequence element in the first sequence systematically having a first value and each (2N)th sequence element in the first sequence systematically having a second value, wherein N is a positive integer and the first value is different from the second value;*

*means for receiving a complex sequence comprising an in-phase component and a quadrature-phase component, the quadrature-phase component systematically comprising the in-phase component multiplied by at least the first sequence of sequence elements; and*

*means for complex multiplying the complex input signal by the complex sequence.*

*265. A spreading method, comprising:*

*generating a first output, a, based on at least one or more first inputs, one or more first orthogonal codes, and one or more first gains;*

*generating a second output, b, based on at least one or more second inputs, one or more second orthogonal codes, and one or more second gains;*

*receiving a first sequence, SC, comprising at least a first element having a first value and a second element having a second value, the first value being different from the second value;*

*receiving a second sequence of sequence elements, W;*

*receiving a third sequence, P; and*

*complex-multiplying a+jb by* $(1+jP\cdot W)\times SC$.

*266. The apparatus of claim 273, wherein SC is generated based on at least a PN code.*

*267. The method of claim 226, wherein*

*the third sequence consists of a sequence of groups, wherein each of the groups consists of either two elements both having the first value or two elements both having the second value.*

*268. The method of claim 267, wherein the third sequence is generated based on a PN code.*

*269. The method of claim 226, wherein SC is a spreading sequence.*

*270. The method of claim 226, wherein SC is generated based on at least a PN code.*

*271. The method of claim 226, wherein SC is a PN code.*

*272. A spreading apparatus comprising:*

*a first input unit configured to receive a complex input signal comprising in-phase data, a, and quadrature-phase data, b;*

*a second input unit configured to receive a first sequence, SC, comprising at least a first element having a first value and a second element having a second value;*

*a third input unit configured to receive a second sequence of sequence elements, W;*

*a fourth input unit configured to receive a third sequence, P; and*

*a complex multiplier for multiplying a+jb by* $(1+jP\cdot W)\times SC$.

*273. The apparatus of claim 272, wherein each (2N−1)th sequence element in the second sequence has a first value and each (2N)th sequence element in the second sequence has a second value, wherein N is a positive integer.*

*274. The apparatus of claim 273, wherein,*

*the third sequence consists of a sequence of groups, wherein each of the groups consists of either two elements both having the first value or two elements both having the second value.*

*275. The method of claim 274, wherein P is generated based on a PN code.*

*276. The apparatus of claim 273, wherein SC is a PN code.*

*277. The method of claim 276, wherein P is generated based on a PN code.*

*278. The apparatus of claim 244, wherein the second sequence is generated based on a PN code.*

*279. A spreading apparatus comprising:*

*a first input unit configured to receive a complex input signal comprising in-phase data, a, and quadrature-phase data, b;*

*a second input unit configured to receive a first sequence, SC, comprising at least a first element having a first value and a second element having a second value;*

*means for receiving a second sequence of sequence elements, W;*

*means for receiving a third sequence, P; and*

*means for multiplying a+jb by (1+jP·W)×SC.*

*280. The apparatus of claim 279, wherein each (2N−1)th sequence element in the second sequence has a first value and each (2N)th sequence element in the second sequence has a second value, wherein N is a positive integer.*

*281. The apparatus of claim 280, wherein,*

*the third sequence consists of a sequence of groups, wherein each of the groups consists of either two elements both having the first value or two elements both having the second value.*

*282. The apparatus of claim 281, wherein the third sequence is generated based on a PN code.*

*283. The apparatus of claim 280, wherein SC is a PN code.*

*284. The apparatus of claim 283, wherein the third sequence is generated based on a PN code.*

*285. The apparatus of claim 280, wherein SC is generated based on at least a PN code.*

*286. The apparatus of claim 152 wherein d is generated by multiplying the third sequence and the second sequence.*

*287. The unit of claim 225, wherein the second sequence is generated based on a second PN code.*

* * * * *